(12) United States Patent
Ono

(10) Patent No.: US 8,018,622 B2
(45) Date of Patent: Sep. 13, 2011

(54) IMAGE FORMING APPARATUS AND IMAGE PROCESSING APPARATUS

(75) Inventor: Kazuaki Ono, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 12/104,120

(22) Filed: Apr. 16, 2008

(65) Prior Publication Data

US 2008/0310873 A1 Dec. 18, 2008

(30) Foreign Application Priority Data

Apr. 19, 2007 (JP) ................................. 2007-111075

(51) Int. Cl.
*H04N 1/40* (2006.01)
(52) U.S. Cl. ........................................ 358/2.1; 358/3.28
(58) Field of Classification Search .................. 358/3.28, 358/1.9, 2.1, 3.06–3.14, 3.16–3.19, 3.21
See application file for complete search history.

(56) References Cited

U.S. PATENT DOCUMENTS

| | | | | |
|---|---|---|---|---|
| 5,864,406 A | 1/1999 | Isaka et al. | ...................... | 358/298 |
| 6,163,414 A | 12/2000 | Kikuchi et al. | ............... | 359/776 |
| 6,256,110 B1 | 7/2001 | Yoshitani | ....................... | 358/1.9 |
| 2005/0058476 A1 | 3/2005 | Murakami | ..................... | 399/366 |
| 2005/0219634 A1 | 10/2005 | Murakami | ..................... | 358/3.28 |
| 2008/0260397 A1 | 10/2008 | Itagaki | | |

FOREIGN PATENT DOCUMENTS

| | | |
|---|---|---|
| JP | 58-47708 | 10/1983 |
| JP | 5-167810 | 7/1993 |
| JP | 8-171252 | 7/1996 |
| JP | 11-004338 | 1/1999 |
| JP | 11-191830 | 7/1999 |
| JP | 11-331621 | 11/1999 |
| JP | 2001-197297 | 7/2001 |
| JP | 2001-353952 | 12/2001 |
| JP | 2003-80690 | 3/2003 |
| JP | 2003-291468 | 10/2003 |
| JP | 2005-91730 | 4/2005 |
| JP | 2005-94326 | 4/2005 |
| JP | 2005-94327 | 4/2005 |

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

An image forming apparatus is constituted by a dark color image forming station for forming an image with such a toner of recording materials having the same hue and different lightness as has a lower lightness; a light color image forming station for forming an image with such a toner of the recording materials having the same hue and different lightness as has a higher lightness; and a control portion for effecting control so that an image to be emphasized by partly disappearing or by relatively and partly decreasing in density is formable substantially only with the toner having the higher lightness.

7 Claims, 25 Drawing Sheets

IMAGE FORMING APPARATUS AND IMAGE PROCESSING APPARATUS

FIELD OF THE INVENTION AND RELATED ART

The present invention relates to an image forming apparatus capable of effecting image formation with at least a pair of recording materials having the same hue and different lightness and capable of forming a forgery-preventing pattern image and relates to an image processing apparatus for being used together with the image forming apparatus. More specifically, the present invention relates to an image forming apparatus capable of combining and outputting a forgery-preventing pattern image with respect to a background of a document for the purpose of suppressing an unauthorized or illicit copying of or forgery of an important document or information leakage and relates to an image processing apparatus for being used together with the image forming apparatus.

In recent years, from the viewpoint of security, there are receipts, bills, and certificates in which a special pattern, which appears as a character or an image upon copying, is embedded or printed in a background in order not to be easily copied. The special pattern is generally called a "forgery preventing pattern" and is contrived so as to prevent an original from being easily duplicated by copying, thus realizing a forgery preventing effect of copying of the original, although the effect is psychological.

The forgery-preventing pattern is, as shown in FIG. 35, constituted by two areas having the same density including an area in which dots remain after copying (hereinafter referred to a "latent image portion") and an area in which dots disappear after copying (hereinafter referred to as a "background portion"). These two areas have a macroscopically substantially identical density. When these two areas are viewed from a distance, of about 30 cm from the areas, called a distance of distinct vision, the two areas are observed at substantially the same density, so that the latent image portion and the background portion are less liable to be discriminated as separate portions. Macroscopically, at first glance, it is not found that a character or an image such as "COPY" is hidden, but the portions microscopically have different characteristics. The hidden character or image is referred to as a "latent image".

When the above-described forgery-preventing pattern technology is performed, a printing paper manufacturer has conventionally printed a forgery-preventing pattern including a character or an image (latent image) such as "COPY" on a special-purpose paper in advance and has sold it as a forgery-preventing paper. Then, government and municipal offices or companies purchase the forgery-preventing papers and print a document intended to guarantee originality of the document on the forgery-preventing paper, thus suppressing copying of the print.

The forgery-preventing paper is prepared by preprinting the forgery-preventing pattern on the special-purpose paper by the printing paper manufacturer, so that the forgery-preventing paper is accompanied with disadvantages in terms of costs, such as a cost of use of the special-purpose paper and a cost of preparation of a more-than-necessary number of pre-print papers.

Recently, as described in Japanese Laid-Open Application (JP-A) 2001-197297, a technique for outputting, by a laser beam printer or the like, such a document that a forgery-preventing pattern image is formed by software and disposed on a background is proposed. Herein, this technique is referred to as an "on-demand forgery-preventing pattern output method by printer".

Further, the printer is required to faithfully embed the forgery-preventing pattern but dot reproducibility is changed, so that the latent image portion and the background portion do not have the same density in some cases. When such a difference in density occurs, the resultant image is judged that it is not genuine due to appearing of the latent image portion although the image is an original image. With respect to such a problem, as described in JP-A 2005-91730 and JP-A 2005-94327, a method in which an optimum forgery-preventing pattern parameter of a forgery-preventing pattern density is easily determined is also proposed.

In this on-demand forgery-preventing pattern output method by printer, it is possible to output a document with a forgery-preventing pattern disposed on a background by use of plain paper, so that the document with the forgery-preventing pattern disposed on the background can be outputted in a necessary number of sheets when needed. Accordingly, it is not necessary to prepare the more-than-necessary number of the forgery-preventing paper as in the conventional manner. That is, in the on-demand forgery-preventing pattern output method by printer, compared with the conventional forgery-preventing method using the forgery-preventing paper, it is possible to greatly reduce a cost with respect to paper (sheet).

The forgery preventing pattern image is required to have such a forgery preventing pattern function that the latent image portion and the background portion have substantially the same density and are not macroscopically discriminated with respect to an original (before copying) and that the background disappears and only the latent image portion remains and appears during copying. However, in a low density area, compared with a high density area, electrostatic latent image dots on a photosensitive member are reduced in size. For this reason, an amount of toner per unit area (density) is liable to be unstable. In an actual image as an image other than the forgery preventing pattern (image), even when an image density is non uniform, there has arisen situations where only density non uniformity occurs in an original for copying. However, particularly, when the image density is non uniform, the latent image portion disappears or the background portion which should originally disappear does not disappear, thus largely affecting the image of the original for copying. For this reason, with respect to suppression of density fluctuation, the forgery preventing pattern image is required to achieve a higher accuracy than the actual image.

Further, there is a conventional image forming apparatus for improving tone gradation in the low density area and suppressing an amount of toner consumption in the high density area by using a plurality of types of toners (a dark color toner and a light color toner) having the same hue and different lightness. In such an image forming apparatus, a color conversion table is used for each of the dark color toner and the light color toner. However, in such an image forming apparatus, when formation of a forgery-preventing pattern image is effected by using a color conversion table for forming an actual image (original image) as it is, the following problem can arise. In this case, a forgery-preventing pattern is formed with the plurality of types of toners consisting of the dark color toner and the light color toner. Ordinarily, it is difficult in some cases to form (transfer) a forgery-preventing pattern image of a toner image consisting of the plurality of types of the toners onto a transfer material with no dot deviation. Due to this dot deviation, the forgery-preventing pattern image at the latent image portion and the background portion cannot be adjusted in proper density in some cases and the density of the forgery-preventing pattern image can fluctuate depending on an individual difference, an environment, image information, and so on of a main assembly of an image forming apparatus. Also with respect to a problem about this dot deviation, similarly as in the case of the problem of the density non-uniformity, the influence of the dot deviation on the forgery-preventing pattern image is larger than that on the actual image. For this reason, also with respect to the dot deviation, the forgery-preventing pattern image is required to achieve a higher accuracy than the actual image.

SUMMARY OF THE INVENTION

A principal object of the present invention is to provide an image forming apparatus capable of suppressing disappearance of a latent image portion and a phenomenon that the latent image portion which should originally disappear does not disappear, during copying of a forgery-preventing pattern image, caused due to density fluctuation and dot deviation of the forgery-preventing pattern image in such an image forming apparatus in which an image is formable with at least a pair of recording materials having the same hue and different lightness.

Another object of the present invention is to provide an image processing apparatus usable together with the image forming apparatus described above.

According to an aspect of the present invention, there is provided an image forming apparatus comprising:

a dark color image forming station for forming an image with such a toner of recording materials having the same hue and different lightness as has a lower lightness;

a light color image forming station for forming an image with such a toner of the recording materials having the same hue and different lightness as has a higher lightness; and a control portion for effecting control so that an image to be emphasized by partly disappearing or by relatively and partly decreasing in density is formable substantially only with the toner having the higher lightness.

According to another aspect of the present invention, there is provided an image processing apparatus for use together with an image forming apparatus comprising a dark color image forming station for forming an image with such a recording material of recording materials having the same hue and different lightness as has a lower lightness, and a light color image forming station for forming an image with such a recording material of the recording materials having the same hue and different lightness as has a higher lightness; the image processing apparatus comprising:

an input portion into which an image data about image to be emphasized by partly disappearing or by relatively and partly decreasing in density is inputtable; and a control portion capable of effecting control so that the image is formed substantially only with the recording material having the higher lightness.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
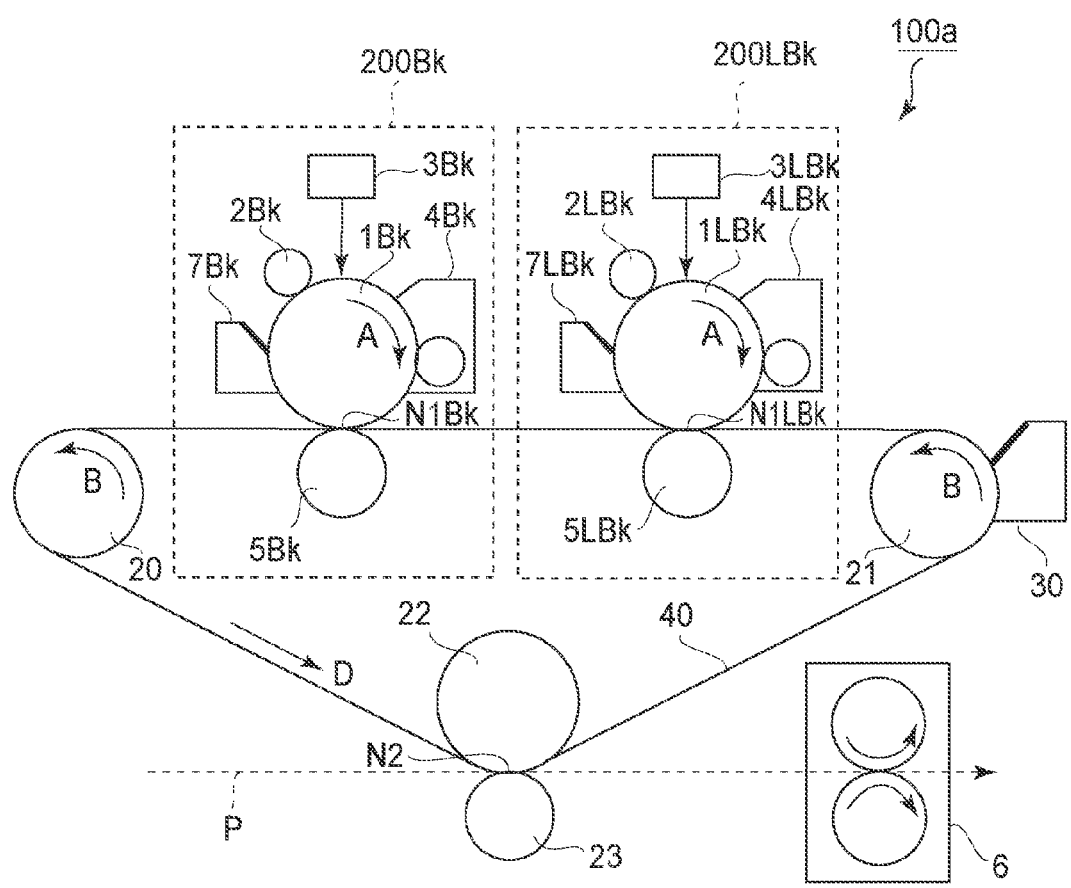
FIGS. 1-5 are schematic sectional views each showing an embodiment of an image forming apparatus to which the present invention is applicable.

Hereinbelow, the image forming apparatus according to the present invention will be described more specifically with reference to the drawings.

Embodiment 1

[General Arrangement and Operation of Image Forming Apparatus]

First, a general arrangement and an operation of an embodiment of an image forming apparatus to which the present invention is applicable will be described.

Incidentally, in the respective drawings, elements (members) having an identical or corresponding function or constitution are represented by identical reference numerals or symbols, thus being omitted from redundant description to a minimum. Further, in the following description, the image forming apparatus can include a plurality of elements, having the substantially same constitution or function, provided for recording materials (specifically, toners) of different types. In the case where these elements are not particularly required to be distinctly described, these elements will be collectively described by omitting suffixes Bk, LBk, C, LC, M, LM, Y, and LY added to the reference numerals in the drawings for representing elements provided for either types of toners.

FIG. 1 to FIG. 4 each shows, as an embodiment of an image forming apparatus to which the present invention is applicable, a schematic sectional constitution of an electrophotographic image forming apparatus capable of effecting image formation with at least a pair of recording materials having the same hue and different lightness. Hereinafter, in this embodiment, a toner having the same hue and a higher lightness is referred to as a toner having the same hue and a lower density (light color toner). Further, a toner having the same hue and a lower lightness is referred to as a toner having the same hue and a higher density (dark color toner). Particularly, the image forming apparatuses 100a, 100b, 100c and 100d employ a combination of two types of toners different in density consisting of a "dark color toner" having a higher density and a "light color toner" having a lower density, as the recording materials having the same hue and the different lightness. Particularly, the image forming apparatuses shown in FIGS. 1-4 are capable of forming images by using the toners having the same hue and the different densities briefly in the following manner. That is, image density information is divided into image data for the dark color toner and image data for the light color toner. A dark color toner image is formed by image exposure on the basis of the image data for the dark color toner and development with the dark color toner, and a light color toner image is formed by image exposure on the basis of the image data for the light color toner and development with the light color toner. By superposing the dark color toner image and the light color toner image with each other, image formation is effected.

FIG. 1 shows an embodiment of a monochromatic (white/black) image forming apparatus.

An image forming apparatus 100a shown in FIG. 1 includes a black (Bk) image forming station 200Bk as a dark color toner image forming station for forming an image with the higher-density dark color toner of the toners having the same hue and the different densities. Further, the image forming apparatus 100a includes a light black (LBk) (or grey) image forming station 200LBk as a light color toner image forming station for forming an image with the lower-density light color toner of the toners having the same hue and the different densities. Thus, in the image forming apparatus 100a shown in FIG. 1, at the dark color toner image forming station for effecting development with the dark color toner and the light color toner image forming station for effecting development with the light color toner, images are formed on different photosensitive drums 1Bk and 1LBk with a black (Bk) toner and a light black (LBk) toner, respectively.

At the image forming station 200, a drum-type electrophotographic photosensitive member as an image bearing member, i.e., a photosensitive drum 1 is provided. The photosensitive drum 1 is rotationally driven in a direction indicated by an arrow A in FIG. 1 (clockwise direction). Around the photosensitive drum 1, a charging roller (charging apparatus) 2 as a charging means for electrically charging the photosensitive drum 1 and an exposure apparatus (a laser scanner in this embodiment) 3 as an exposure means (image writing means) for writing an electrostatic image onto the photosensitive drum 1 are provided. Further, around the photosensitive drum 1, a developing device 4 as a developing means for developing the electrostatic image on the photosensitive drum 1 and a cleaner (cleaning apparatus) 7 as a cleaning means for cleaning a surface of the photosensitive drum 1 are provided.

Further, an intermediary transfer belt 40 formed with an endless belt as an intermediary transfer member is provided opposite to the photosensitive drums 1LBk and 1Bk of the respective image forming stations 200LBk and 200Bk. The intermediary transfer belt 40 is stretched among three rollers consisting of a drive roller 20, a supporting roller 21 and a back-up roller 21 as a plurality of supporting members and is circulated and moved (rotated) in a direction indicated by an arrow D in the figure by rotational drive of the drive roller 20 in a direction indicated by an arrow B in the figure.

On an inner peripheral surface side of the intermediary transfer belt 40, a primary transfer roller (primary transfer apparatus) 5 as a primary transfer means is disposed at a position opposite to the photosensitive drum 1 of each image forming station 200. The primary transfer roller 5 contacts the inner peripheral surface of the intermediary transfer belt 40 and presses the intermediary transfer belt 40 toward the photosensitive drum 1. By this, a nip (primary transfer nip) is formed at a primary transfer portion N1 at which the intermediary transfer belt 40 and the photosensitive drum 1 contact each other. Further, at a position opposite to the back-up roller 22 on an outer peripheral surface side of the intermediary transfer belt 40, a secondary transfer roller (secondary transfer apparatus) 23 as a secondary transfer means is disposed. The secondary transfer roller 23 press-contacts the intermediary transfer belt 40 at the position opposite to the back-up roller 22 to form a nip (secondary transfer nip) at a secondary transfer portion N2 at which the intermediary transfer belt 40 and the secondary transfer roller 23.

Incidentally, in the image forming apparatus 100a shown in FIG. 1, the plurality of the image forming stations are disposed along a movement direction of a toner image transfer surface of the intermediary transfer belt 40 in the order of the image forming station 200LBk for LBk and the image forming station 200Bk for Bk.

The surface of the rotating photosensitive drum 1 is electrically charged by the charging roller 2 to a negative polarity substantially uniformly in this embodiment (e.g., charge potential: −400 V). Next, the surface of the photosensitive drum 1 is irradiated with laser light corresponding to image information by the exposure apparatus 3, so that an electrostatic image is formed on the photosensitive drum 1 (e.g., light portion potential: −50 V).

Then, the electrostatic image on the photosensitive drum 1 is developed as a toner image by the developing device 4. The developing device 4 includes a developing sleeve as a developer carrying member for carrying a toner as a developer to a developing portion opposing the photosensitive drum 1. During the development, to the developing sleeve, a predetermined developing bias (e.g., DC: −250 V, AC: 1000 Vpp) is applied. By this, in this embodiment, a toner charged to a negative polarity is transferred from the developing sleeve onto the photosensitive drum 1 depending on the electrostatic image on the photosensitive drum 1. In this embodiment, a toner image is formed on the photosensitive drum 1 by a reverse developing method in which the toner charged to an identical polarity to the charge polarity of the photosensitive drum 1 is deposited on a portion irradiated with the laser light (charge-attenuated portion) on the photosensitive drum 1.

The toner image on the photosensitive drum 1 is electrostatically transferred onto the intermediary transfer belt 40 (primary transfer) by a voltage of an opposite polarity (positive polarity in this embodiment) to a normal charge polarity of the toner.

The photosensitive drum 1 after a primary transfer step is completed is electrically charged again substantially uniformly by the charging roller 2 to be subjected to subsequent image formation after toner (transfer residual toner) remaining on the surface of the photosensitive drum 1 is removed and collected by the cleaner 7.

In the image forming apparatus 100a of FIG. 1, during formation of an actual image (original image) (during original image formation), the above-described steps are successively performed at the LBk image forming station 200LBk and the Bk image forming station 200Bk. By this, first, the LBk toner image formed on the photosensitive drum 1LBk depending on image information is primary-transferred onto the intermediary transfer belt 40. Next, in a similar manner, the Bk toner image formed on the photosensitive drum 1Bk depending on image information is primary-transferred onto the LBk toner image on the intermediary transfer belt 40 in a superposition manner.

Next, the superposed toner images of the two types of toners on the intermediary transfer belt 40 are transferred onto a transfer material P (secondary transfer) by the secondary transfer roller 23 to which a voltage of an opposite polarity (positive polarity in this embodiment) to the normal charge polarity of the toner is applied.

The transfer material P is conveyed to the secondary transfer portion N2 at predetermined timing by an unshown transfer material supplying means.

The intermediary transfer belt 40 after a secondary transfer step is completed is subjected to subsequent image formation after toner (transfer residual toner) remaining on the surface of the intermediary transfer belt 40 is removed and collected by an intermediary transfer belt cleaner (intermediary transfer belt cleaning apparatus) 30 as an intermediary transfer member cleaning means.

The transfer material P carrying thereon the toner image secondary-transferred from the intermediary transfer belt 40 is, after being separated from the intermediary transfer belt 40, conveyed to a fixing apparatus 6 as a fixing means in which the transfer material P is subjected to application of heat and pressure. By this, the toner image on the transfer material P is fixed on the transfer material P. Thereafter, the transfer material P is discharged to the outside of a main assembly of the image forming apparatus 100a.

The image forming apparatus 100a of FIG. 1 is called a tandem-type image forming apparatus in which a plurality of image forming stations are disposed and one image can be formed by one rotation (circulation) of the intermediary transfer belt 40. For this reason, the image forming apparatus 100a having such a constitution has an advantage that it is suitable for high-speed image formation.

In the tandem-type image forming apparatus as shown in FIG. 1, a dark color image forming means for forming the dark color toner image on the transfer material P is constituted by the following means. That is, the means include the photosensitive drum 1, the charging roller 2, the exposure apparatus 3, the developing device 4 and the primary transfer roller 5 at the image forming station using the dark color toner, and the intermediary transfer belt 40 and the secondary transfer roller 23. Further, a light color image forming means for forming the dark color toner image on the transfer material P is constituted by the following means. That is, the means include the photosensitive drum 1, the charging roller 2, the exposure apparatus 3, the developing device 4 and the primary transfer roller 5 at the image forming station using the light color toner, and the intermediary transfer belt 40 and the secondary transfer roller 23. Here, the intermediary transfer belt 40 and the secondary transfer roller 23 are common to the dark color image forming means and the light color image forming means.

Figure 2:
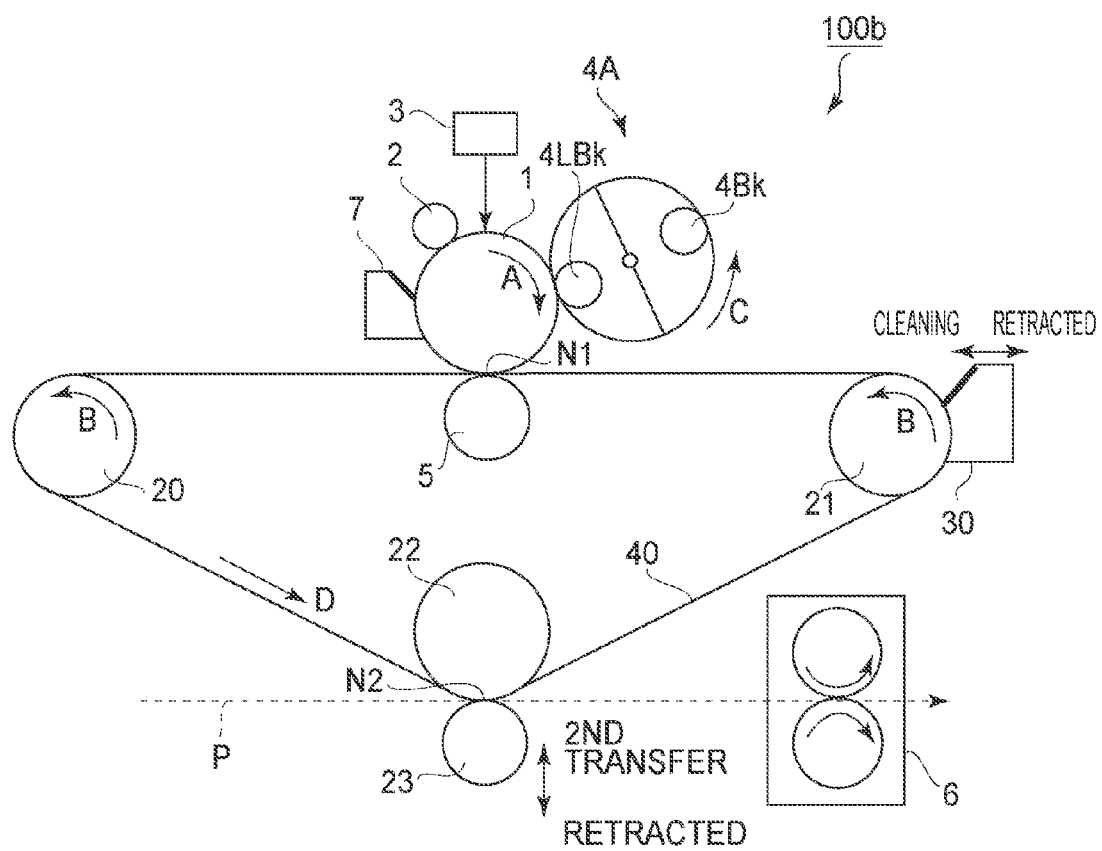

FIG. 2 shows another embodiment of the monochromatic image forming apparatus.

An image forming apparatus 100b shown in FIG. 2 uses, similarly as in the image forming apparatus 100a of FIG. 1, the Bk toner being the dark color toner and the LBk toner being the light color toner as the toners having the same hue and different densities. However, the image forming apparatus 100b of FIG. 2 does not include the plurality of the image forming stations as provided in the image forming apparatus 100a of FIG. 1 but includes a plurality of developing devices 4 for one photosensitive drum 1. In the image forming apparatus 100b, development is performed by different developing devices with a dark color toner and a light color toner, respectively.

That is, the image forming apparatus 100b of FIG. 2 includes a rotary-type developing device 4A in which the plurality of developing devices 4 is disposed on a rotatable developing device supporting member (rotatable member). In this rotary-type developing device 4A, a Bk developing device 4Bk using the Bk toner being the dark color toner and an LBk developing device 4LBk using the LBk toner being the light color toner are disposed. By the rotation of the developing device supporting member, it is possible to move a desired developing device 4 to a position (developing position) opposite to the photosensitive drum 1. In this way, in the image forming apparatus 200b of FIG. 2, a dark color developing portion for effecting development with the dark color toner and a light color developing portion for effecting development with the light color toner form images with the Bk toner and the LBk toner, respectively, at the substantially same position on the single photosensitive drum 1.

Further, in the image forming apparatus 100b of FIG. 2, a secondary transfer roller 23 is movable between a contact position (secondary transfer position) at which the secondary transfer roller 23 contacts the surface of the intermediary transfer belt 40 and a spaced position (retracted position) at which the secondary transfer roller 23 is spaced apart from the surface of the intermediary transfer belt 40. Similarly, an intermediary transfer belt cleaner 30 is movable between a contact position (cleaning position) at which the cleaner so contacts the surface of the intermediary transfer belt 40 and a spaced position (retracted position) at which the cleaner 30 is spaced apart from the surface of the intermediary transfer belt 40.

In the image forming apparatus 200b of FIG. 2, first, similarly as in the operation at each of the image forming stations 200 of the image forming apparatus 100a of FIG. 1, an LBk toner image corresponding to image information is formed on the photosensitive drum 1 by using the LBk developing device 4LBk. Then, by a voltage, of an opposite polarity (positive polarity in this embodiment) to a normal charge polarity of a toner, applied to a primary transfer roller 5, the LBk toner image is primary-transferred onto the intermediary transfer belt 40.

Then, the intermediary transfer belt 40 carrying thereon the LBk toner image continues rotational movement. At this time, from the intermediary transfer belt 40, the secondary transfer roller 23 and the intermediary transfer belt cleaner 30 are retracted, so that the intermediary transfer belt 40 can prepare for the primary transfer step for a second color with no disturbance of the LBk toner image on the intermediary transfer belt 40.

During the rotation of the intermediary transfer belt 40 carrying the LBk toner image thereon, the Bk developing device 4Bk and the LBk developing device 4LBk of the rotary-type developing device 4A are rotated in an arrow C direction to dispose the developing device 4Bk at the position (developing position) opposite to the photosensitive drum 1.

Then, similarly as during the LBk toner image formation, the Bk toner image corresponding to image information is formed on the photosensitive drum 1 by using the Bk developing device 4Bk. Then, by a voltage, of an opposite polarity (positive polarity in this embodiment) to the normal charge polarity of the toner, applied to the primary transfer roller 5, the Bk toner image is primary-transferred onto the intermediary transfer belt 40 by being superposed on the LBk toner image or the intermediary transfer belt 40.

The photosensitive drum 1 each after a primary transfer step using each other toners is completed is subjected to subsequent image formation after toner (transfer residual toner) remaining on the surface of the photosensitive drum 1 is removed and collected by the cleaner 7.

Next, the retracted secondary transfer roller 23 is returned to the secondary transfer position at which the secondary transfer roller 23 contacts the intermediary transfer belt 40, in order to prepare for the secondary transfer step.

Then, the superposed toner images of the two types of toners on the intermediary transfer belt 40 are secondary-transferred onto a transfer material P by the secondary transfer roller 23 to which a voltage of an opposite polarity (positive polarity in this embodiment) to the normal charge polarity of the toner is applied.

The transfer material P is conveyed to the secondary transfer portion N2 at predetermined timing by an unshown transfer material supplying means.

On the other hand, the retracted intermediary transfer belt cleaner 30 is returned to the cleaning position at which the cleaner 30 contacts the intermediary transfer belt 40, in order to prepare for the cleaning step of the intermediary transfer belt 40.

Then, the intermediary transfer belt 40 after a secondary transfer step is completed is subjected to subsequent image formation after toner (transfer residual toner) remaining on the surface of the intermediary transfer belt 40 is removed and collected by an intermediary transfer belt cleaner 30.

The transfer material P carrying thereon the toner image secondary-transferred from the intermediary transfer belt 40 is, after being separated from the intermediary transfer belt 40, conveyed to a fixing apparatus 6 in which the toner image on the transfer material P is fixed on the transfer material P. Thereafter, the transfer material P is discharged to the outside of a main assembly of the image forming apparatus 100a.

The image forming apparatus 100a of FIG. 2 is called a single drum-type image forming apparatus in which images are formed on the single photosensitive drum 1 by using a plurality of developing devices and one image can be formed by a plurality of rotations (circulations) of the intermediary transfer belt 40. For this reason, compared with the image forming apparatus 100a of FIG. 1, the image forming apparatus 100b of FIG. 2 is disadvantageous for high-speed image formation but the number of parts thereof can be reduced, thus having advantages of low cost and downsizing (space saving).

In the one drum-type image forming apparatus as shown in FIG. 2, a dark color image forming means for forming the dark color toner image on the transfer material P is constituted by the following means. That is, the means include the photosensitive drum 1, the charging roller 2, the exposure apparatus 3, the developing device 4 for the dark color toner, the primary transfer roller 5, the intermediary transfer belt 40, and the secondary transfer roller 23. Further, a light color image forming means for forming the dark color toner image on the transfer material P is constituted by the following means. That is, the means include the photosensitive drum 1, the charging roller 2, the exposure apparatus 3, the developing device 4 for the light color toner, the primary transfer roller 5, the intermediary transfer belt 40, and the secondary transfer roller 23. Here, the photosensitive drum 1, the charging roller 2, the exposure apparatus 3, the primary transfer roller 5, the intermediary transfer belt 40 and the secondary transfer roller 23 are common to the dark color image forming means and the light color image forming means.

Figure 3:
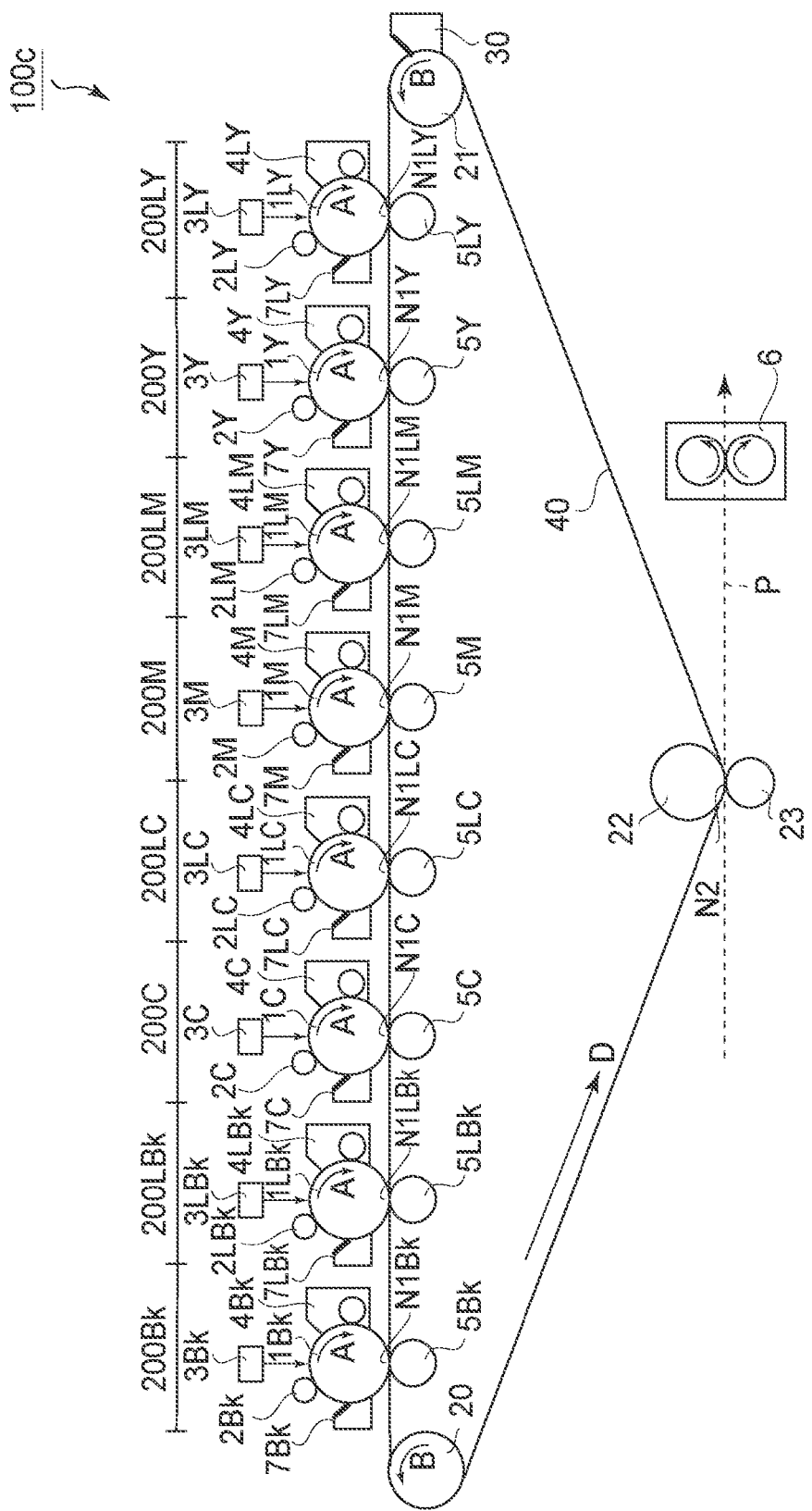

FIG. 3 shows an embodiment of a color image forming apparatus.

An image forming apparatus 100c shown in FIG. 3 is a tandem-type image forming apparatus, similar to the image forming apparatus 100a of FIG. 1, capable of forming a full-color image by using at least one set (combination) of toners having the same hue and different densities.

The image forming apparatus 100c of FIG. 3 employs, as the combination of toners having the same hue and different densities, combinations shown below in addition to the combination of the Bk toner being the dark color toner and the LBk toner being the light color toner similar to that in the case of the image forming apparatus 100a of FIG. 1. That is, the combinations include a combination of a yellow (Y) toner and a light yellow (LY) toner, a combination of a magenta (M) toner and a light magenta (LM) toner, and a combination of a cyan (C) and a light cyan (LC) toner, as the combination of the dark color toner and the light color toner.

That is, the image forming apparatus 100c of FIG. 3 includes a Bk image forming station 200Bk, a C image forming station 200C, an M image forming station 200MN, and a Y image forming station 200Y, as a dark color toner image forming station for forming an image with a dark color toner.

Further, the image forming apparatus 100c of FIG. 3 includes an LBK image forming station 200LBk, an LC image forming station 200LC, an LM image forming station 100LM, and an LY image forming station 200LY, as a light color toner image forming station for forming an image with a light color toner.

In the image forming apparatus 100c shown in FIG. 3, the plurality of image forming stations is disposed along a movement direction of a toner image transfer surface of the intermediary transfer belt 40 in the order of the image forming stations for LY, Y, LM, M, LC, C, LBk, and Bk.

An operation in the case of forming an actual image (original image) in the image forming apparatus 100c of FIG. 3 is substantially similar to that in the case of the image forming apparatus 100a of FIG. 1 except that the number of the image forming stations is increased. That is, in the image forming apparatus 100c of FIG. 3, e.g., during a full-color actual image (original image) formation, the respective toner images for LY, Y, LM, M, LC, C, LBk, and Bk are successively transferred onto the intermediary transfer belt 40 in a superposition manner. Formation of a toner image on each of the photosensitive drums 1 and transfer of the toner image onto the intermediary transfer belt 40 are performed similarly as in the cases of the toner images for LBk and Bk in the image forming apparatus 100a of FIG. 1.

The superposed toner images of eight types of toners on the intermediary transfer belt 40 are secondary-transferred onto a transfer material P similarly as in the case of the image forming apparatus 100a of FIG. 1 and thereafter the transferred toner images are fixed on the transfer material P by the fixing apparatus 6.

Incidentally, the image forming apparatus 100c of FIG. 3 includes the eight image forming stations but the image forming apparatus to which the present invention is applicable is not limited thereto. For example, an image forming apparatus having six image forming stations may be constituted by omitting the LBk image forming station 200LBk and the LY image forming station 200LY and any combination of the image forming stations may be employed.

Figure 4:
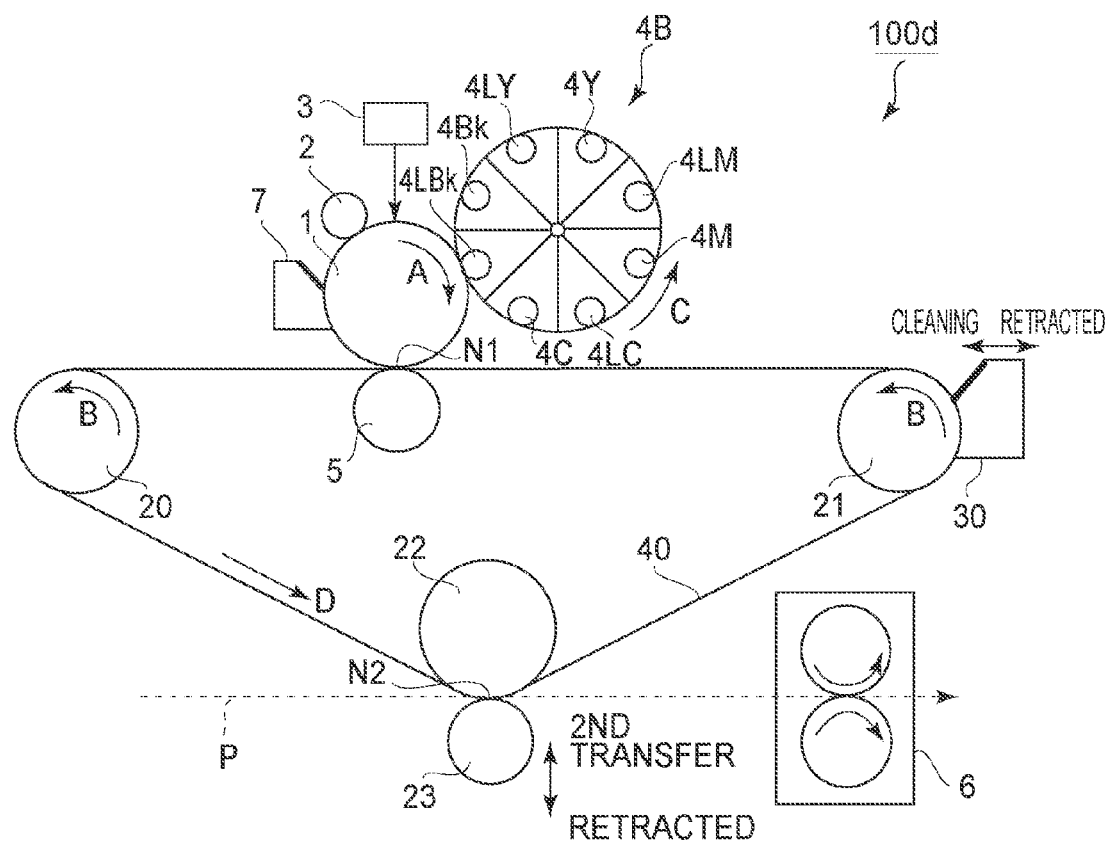

FIG. 4 shows another embodiment of the color image forming apparatus.

An image forming apparatus 100d shown in FIG. 4 is a tandem-type image forming apparatus, similar to the image forming apparatus 100b of FIG. 2, capable of forming a full-color image by using at least one set (combination) of 4 toners having the same hue and different densities.

The image forming apparatus 100d of FIG. 4 employs, as the combination of toners having the same hue and different densities, combinations shown below in addition to the combination of the Bk toner being the dark color toner and the LBk toner being the light color toner similar to that in the case of the image forming apparatus 100b of FIG. 2. That is, the combinations include a combination of a yellow (Y) toner and a light yellow (LY) toner, a combination of a magenta (M) toner and a light magenta (LM) toner, and a combination of a cyan (C) and a light cyan (LC) toner, as the combination of the dark color toner and the light color toner.

That is, the image forming apparatus 100d of FIG. 4 includes a Bk developing device 4Bk, an LBk developing device 4LBk, a C developing device 4C, an LC developing device 4LC, a M developing device 4M, an LM developing device 4LK, a Y developing device 4Y, and an LY developing device 4LY, which are rotatably disposed. Similarly as in the image forming apparatus 100b of FIG. 2, the respective developing devices are mounted to a rotatable developing device supporting member (rotatable member) to constitute a rotary-type developing device 4B.

An operation in the case of forming an actual image (original image) in the image forming apparatus 100d of FIG. 4 is substantially similar to that in the case of the image forming apparatus 100b of FIG. 2 except that the number of the developing devices is increased. That is, in the image forming apparatus 100d of FIG. 4, e.g., during a full-color actual image (original image) formation, the respective toner images for LY, Y, LM, M, LC, C, LBk, and Bk are successively transferred onto the photosensitive drum 1. Formation of a toner image on the photosensitive drum 1 is performed similarly as in the cases of the toner images for LBk and Bk in the image forming apparatus 100b of FIG. 2. Then, these toner images are transferred onto the intermediary transfer belt 40 each time when one of the toner images is formed on the photosensitive drum 1. By this, the respective toner images for LY, Y, LM, M, LC, C, LBk, and Bk and successively superposed on the intermediary transfer belt 40, thus being primary-transferred.

The superposed toner images of eight types of toners on the intermediary transfer belt 40 are secondary-transferred onto a transfer material P similarly as in the case of the image forming apparatus 100b of FIG. 2 and thereafter the transferred toner images are fixed on the transfer material P by the fixing apparatus 6.

Incidentally, the image forming apparatus 100d of FIG. 4 includes the eight developing devices but the image forming apparatus to which the present invention is applicable is not limited thereto. For example, an image forming apparatus having six developing devices may be constituted by omitting the LBk developing device 4LBk and the LY developing device 4LY and any combination of the image forming stations may be employed.

Here, several image forming apparatuses to which the present invention is applicable are exemplary described with reference to FIGS. 1-4, embodiments of the image forming apparatus of the present invention are not limited to those described above.

For example, an embodiment in which the tandem-type image forming apparatus and the single drum-type image forming apparatus are combined can be considered. That is, an image forming apparatus including an image forming station at which a single developing device is provided with respect to a single photosensitive drum and an image forming station at which a plurality of developing devices is provided with respect to a single photosensitive drum may be constituted.

Further, the image forming apparatus 100a-100d of FIGS. 1-4 are described as those of an intermediary transfer type employing the intermediary transfer member but the present invention is not limited thereto. Instead of the intermediary transfer member, a direct transfer type image forming apparatus using a transfer material carrying member for carrying and conveying the transfer material may also be employed.

Figure 5:
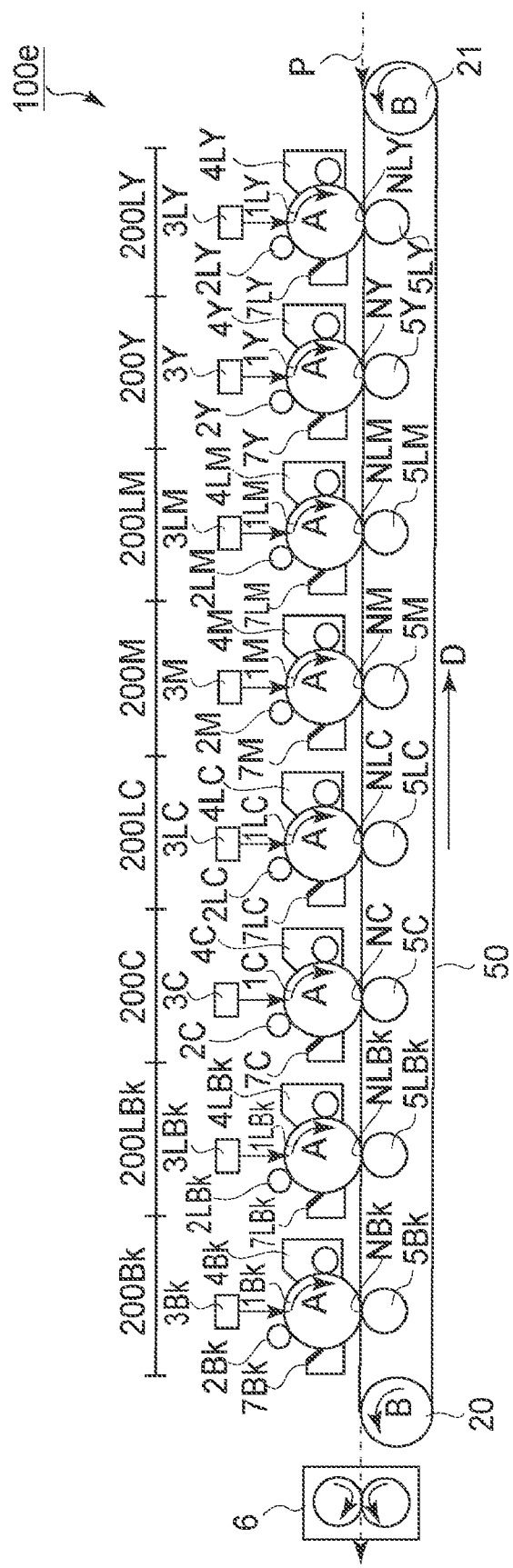

For example, FIG. 5 shows a schematic sectional constitution of an image forming apparatus 100e, employing the direct transfer type, which includes eight image forming stations similarly as in the image forming apparatus 100c of FIG. 3. The image forming apparatus 100e of FIG. 5 includes a conveyer belt 50 formed with an endless belt as a transfer material carrying member, instead of the intermediary transfer belt 40 of the image forming apparatus 100c of FIG. 3. On an inner peripheral surface side of the conveyer belt 50, a transfer roller 5 as a transfer means having the substantially same function as the primary transfer roller of the image forming apparatus 100c of FIG. 3 is provided opposite to each of the photosensitive drums 1. The transfer roller 5 presses the conveyer belt 50 toward the photosensitive drum 1. By this, a nip (transfer nip) is formed at a transfer portion N at which the conveyer belt 50 and the photosensitive drum 1 contact each other. A transfer material P is supplied onto the conveyer belt 50 at predetermined timing and may preferably be electrostatically adsorbed by the conveyer belt 50. Then, by rotation of the conveyer belt 50 in a direction indicated by an arrow D in the figure, toner images consisting of a plurality of types of toners are successively transferred, at the respective transfer portions N, from the respective photosensitive drums 1 onto the transfer material P carried on the conveyer belt 50 in a superposition manner. Thereafter, the transfer material P is separated from the conveyer belt 50 and conveyed to a fixing apparatus 6 in which the toner images are fixed on the transfer material P.

In this case, a dark color image forming means for forming a dark color toner image on the transfer material P is constituted by including means consisting of the photosensitive drum 1, the charging roller 2, the exposure apparatus 3, the developing device 4, and the transfer roller 5 at an image forming station using a dark color toner. Further, a latent image forming means for forming a light color toner image on the transfer material P is constituted by including means consisting of the photosensitive drum 1, the charging roller 2, the exposure apparatus 3, the developing device 4, and the transfer roller 5 at an image forming station using a light color toner.

Similarly, e.g., in the case where the direct transfer type is employed in the single drum type image forming apparatus such as the image forming apparatus 100d of FIG. 4, by circulating the conveyer belt 50 plural times, the transfer material P carried on the conveyer belt 50 is conveyed to the same transfer portion plural times. By this, it is possible to transfer toner images consisting of a plurality of types of toners onto the transfer material P on the conveyer belt 50 in a superposition manner.

In this case, a dark color image forming means for forming a dark color toner image on the transfer material P is constituted by including means consisting of the photosensitive drum 1, the charging roller 2, the exposure apparatus 3, the developing device 4 for the dark color toner, and the transfer roller 5. Further, a light color toner image forming means for forming a light color toner image on the transfer material P is constituted by including means consisting of the photosensitive drum 1, the charging roller 2, the exposure apparatus 3, the developing device 4 for the light color toner, and the transfer roller 5. Here, the photosensitive drum 1, the charging roller 2, the exposure apparatus 3, and the transfer roller 5 are common to the dark color toner forming means and the light color toner forming means.

Either of the above-described image forming apparatuses may have a function as a copying machine for forming (copying) an image depending on image information from an image reading means (not shown) which is provided or communicatably connected to a main assembly of the image forming apparatus. Further, in addition thereto or instead thereof, either of the above-described image forming apparatuses may have a function as a printer for forming (printing) an image depending on image information from host equipment (not shown) such as a personal computer or the like communicatably connected to the image forming apparatus main assembly.

Figure 32:
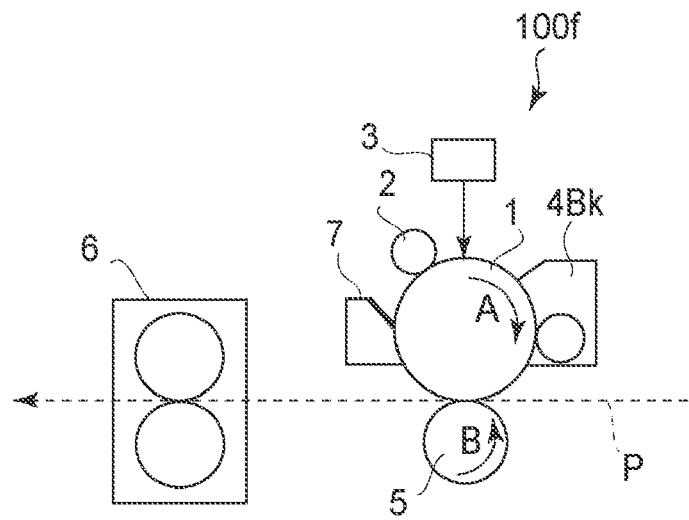
FIGS. 32-34 are schematic sectional views each showing an embodiment of a conventional image forming apparatus using only a dark color toner.
Figure 33:
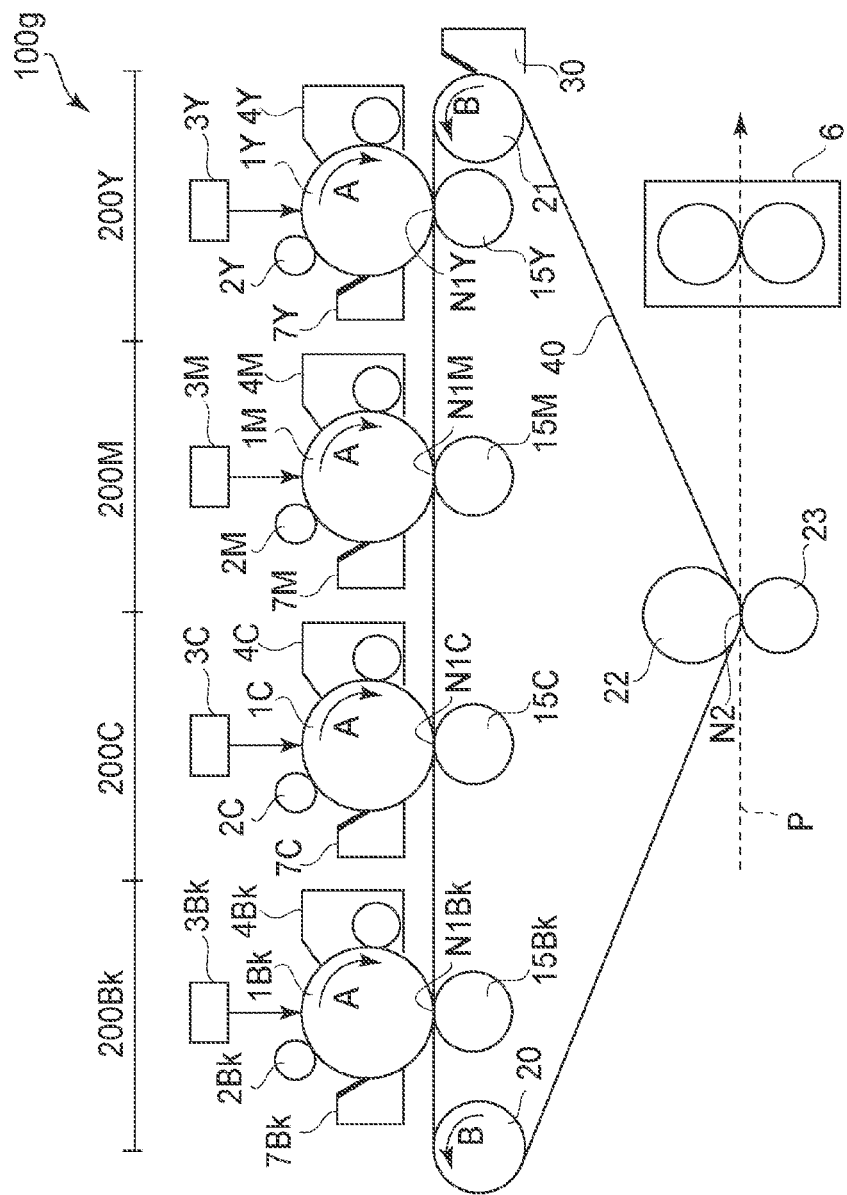
Figure 34:
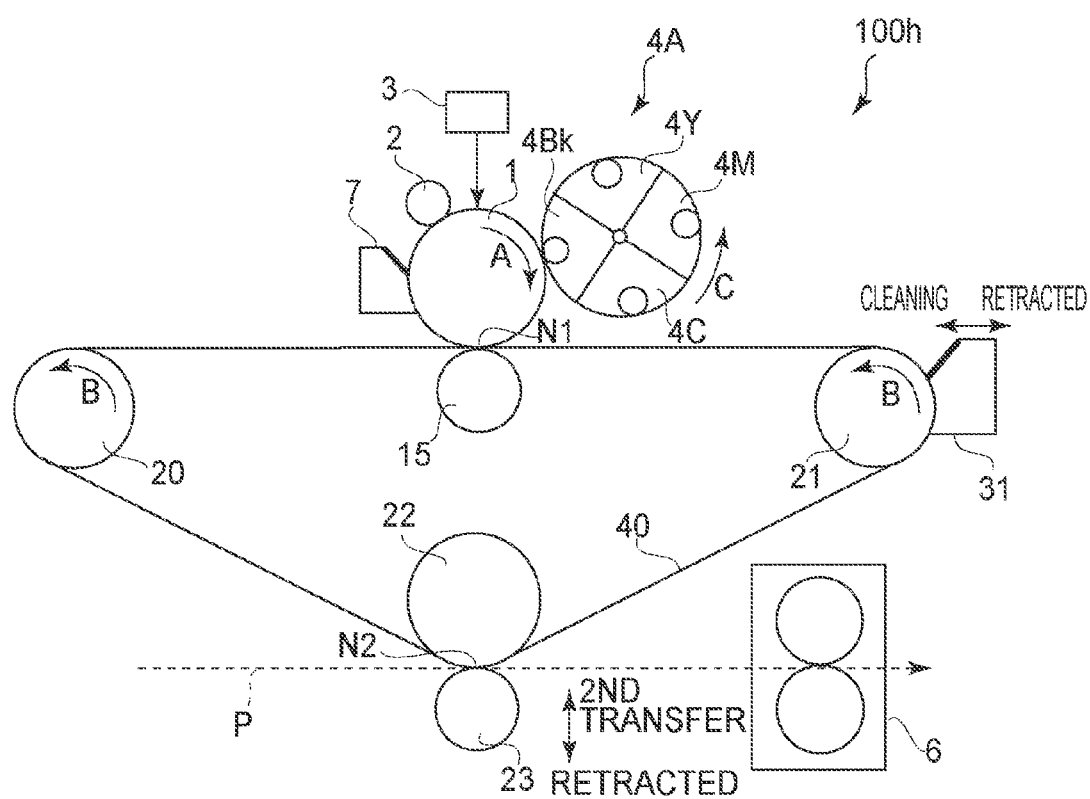
Figure 35:
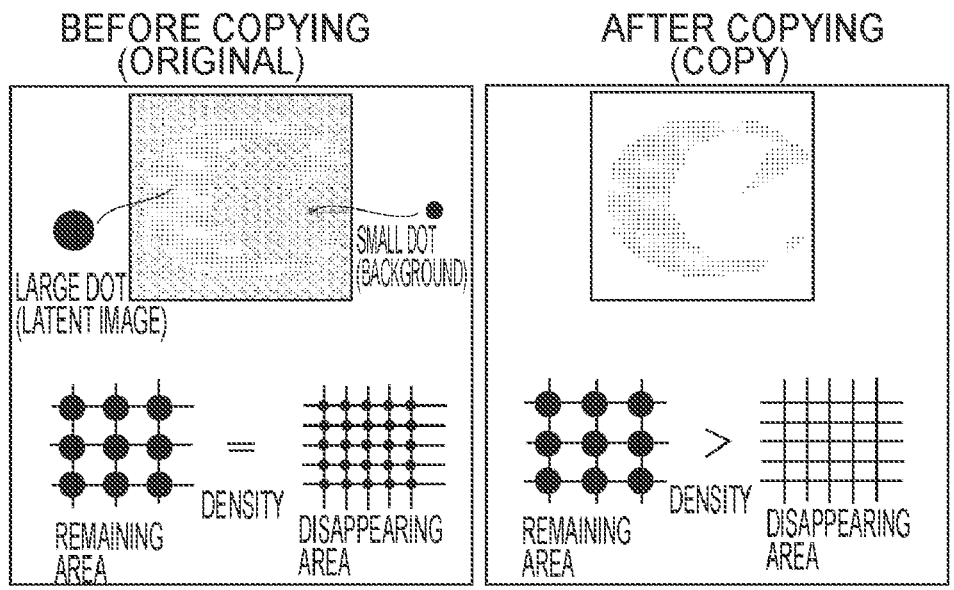
FIG. 35 is a schematic view showing an embodiment of a constitution of a forgery-preventing pattern image before copying (original) and a forgery-preventing pattern image after copying (copy).

Incidentally, each of FIGS. 32-34 shows an embodiment of a conventional image forming apparatus using only a dark color toner. In image forming apparatuses 100f, 100g and 100h shown in FIG. 32, FIG. 33 and FIG. 34, respectively, elements identical or corresponding to those in FIGS. 1-4 are represented by identical reference numerals or symbols. The image forming apparatus 100f of FIG. 32 is an embodiment of a monochromatic image forming apparatus using only the dark color toner and configured to directly transfer a toner image from a photosensitive drum 1 to a transfer material P. Further, the image forming apparatus 100g of FIG. 33 is an embodiment of a tandem-type color image forming apparatus using only the dark color toner and forms a color image in the same manner as in those of FIGS. 1 and 3 except that the number of image forming stations is different from those in the image forming apparatuses of FIGS. 1 and 3. Further, the image forming apparatus 100h of FIG. 34 is an embodiment of a single drum-type color image forming apparatus using only the dark color toner and forms a color image in the same manner as in those of FIGS. 2 and 4 except that the number of developing devices is different from those of the image forming apparatuses of FIGS. 2 and 4.

[Image Processing System]

Next, an image processing system will be described.

Figure 6:
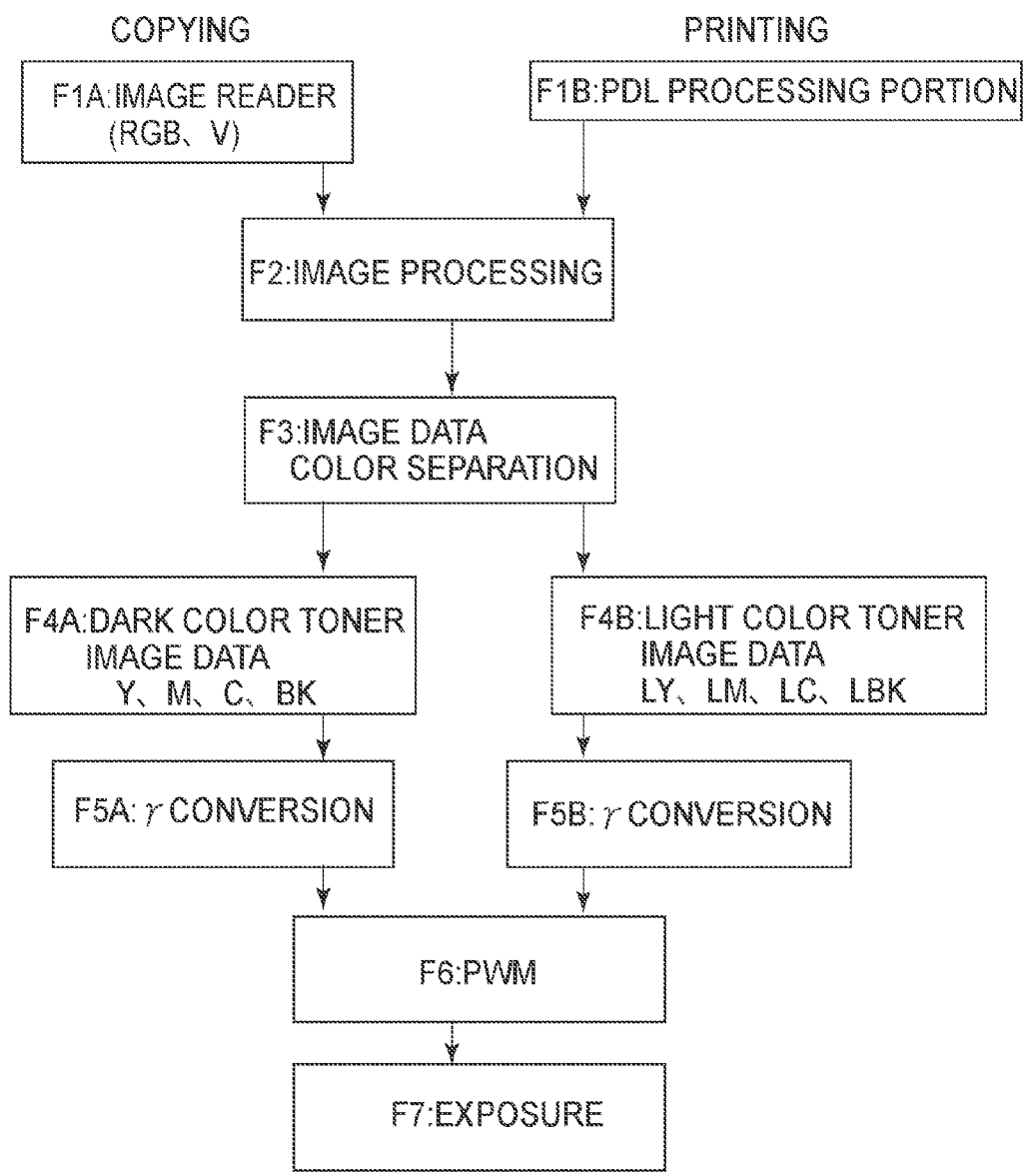
FIG. 6 is a block diagram showing an embodiment of an image processing system.

FIG. 6 is a block diagram of the image processing system in this embodiment.

During copying, reading of an original image is performed by an image reading means (reader) using a solid-state image pick-up device such as a CCD or the like (F1A). During printing, image data expanded from a PDL (page description language) processing portion is sent from a computer or the like (F1B). In the case of color image processing, the image data signal is an RGB signal and in the case of monochromatic image processing, the image data signal is a V (brightness) signal.

Next, an analog signal outputted from the CCD and then amplified is subjected to A/D conversion to be converted into 8 to 10 bit digital signal. This digital signal is subjected to shading correction and then subjected to image processing including color space conversion, logarithmic conversion, black formation, color correction, and the like (F2). Incidentally, the image data may also be read from a memory, in which the image data is stored, and subjected to similar processing.

The image data obtained through the image processing (F2) is color-separated into image data for respective colors (F3) to prepare a dark color toner image data (F4A) and a light color toner image data (F4B).

Each of the color-separated image data for the dark color toner and the light color toner is subjected to γ correction therefor (F5A, F5B) and then subjected to pulse width modulation (PWM) (F6). With respect to the PWM, it is preferable that the image is formed with large dots so as to improve dot reproducibility at a highlight portion (low density portion) to increase a recording unit. For example, with respect to the image data for the light color toner, two-pixel PWM is performed in order to enhance tone gradation to increase the recording unit. On the other hand, with respect to the image data for the dark color toner, one-pixel PWM is performed in view of importance of resolution. Incidentally, instead of the PWM, intensity modulation or dithering may also be used.

In accordance with the image data for the dark color toner and the light color toner after the PWM, image exposure of the surface of the photosensitive drum is performed by the exposure apparatus (F7).

Figure 7:
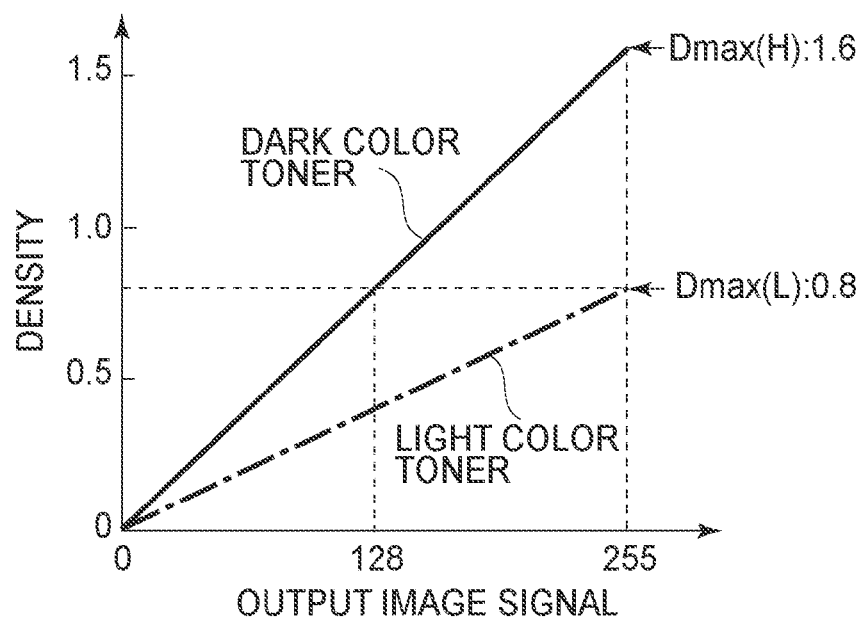
FIG. 7 is a graph showing an embodiment of a relationship between an output image signal (toner areal ratio or toner deposition amount) and an output image density.

In the image forming apparatus using the dark color toner and the light color toner, between the dark color toner and the light color toner, it is desirable that a relationship between an output image signal and a density (reflection density), e.g., as shown in FIG. 7 is established. Incidentally, a difference in density between the dark color toner and the light color toner is caused by, e.g., a difference in amount of a pigment contained in toner particles. Further, the density of each of the toners depends on the image forming apparatus. Generally, as shown by a solid line in FIG. 7, the density of the dark color toner may desirably be set so that a maximum density (optical density) Dmax (H) is 1.3-2.0. Further, generally, as shown by alternate long and short dashed lines of FIG. 7, the density of the light color toner may desirably be set so that a maximum density Dmax(L) is 0.2-1.0. Preferably, the light color toner density is 50% or less of the dark color toner density.

More specifically, the toners having the same hue and different densities typically mean toners which have equal spectral characteristics of coloring components (pigments) contained in the toners each generally comprising base materials consisting of a resin material and a pigment and which have different amounts of the pigments. Further, the same hue means that the spectral characteristics of the coloring components (pigments) are identical to each other but, even when they are not strictly identical to each other, is in such a range that two colors can be called the same color such as magenta, cyan, yellow, black, or the like in terms of an ordinary color concept.

Further, with respect to a toner particle size and a toner charge amount, it is suitable that they are same level for the dark color toner and the light color toner.

The gradation characteristic shown in FIG. 7 varies depending on the toner particle size, a coloring material contained in toner, and γ conversion but it is suitable that slope ratios are same level for the dark color toner and the light color toner.

Figure 8:
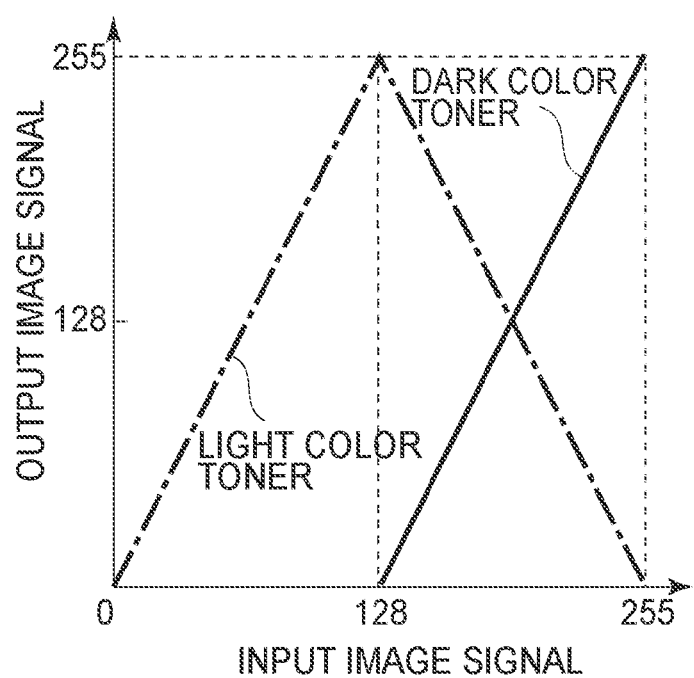
FIGS. 8 and 9 are graphs each for illustrating an embodiment of a color conversion table showing a relationship between an input image signal and an output image signal.

For example, a color conversion table of a typical embodiment of color separation from a conventional dark color toner (Bk) into the dark color toner (Bk) and a light color toner (LBk) performed in the image data color separation (F3) is shown in FIG. 8. In the color conversion table of FIG. 8, an abscissa represents an input image signal of the image data for the conventional dark color toner (Bk) and an ordinate represents an output image signal of the image data for the dark color toner (Bk) and the light color toner (LBk). The dark color toner (Bk) is represented by a solid line and the light color toner is represented by alternate long and short dashed lines. As shown in FIG. 8, control is effected so that at a low density portion, the output image signal of the light color toner (LBk) is increased and at a portion toward a high density portion, the output image signal of the dark color toner (Bk) is increased. It is suitable that the output image signal of the light color toner (LBk) is described from a medium density portion toward the high density portion in order to observe limitation of a toner amount per unit area.

Figure 9:
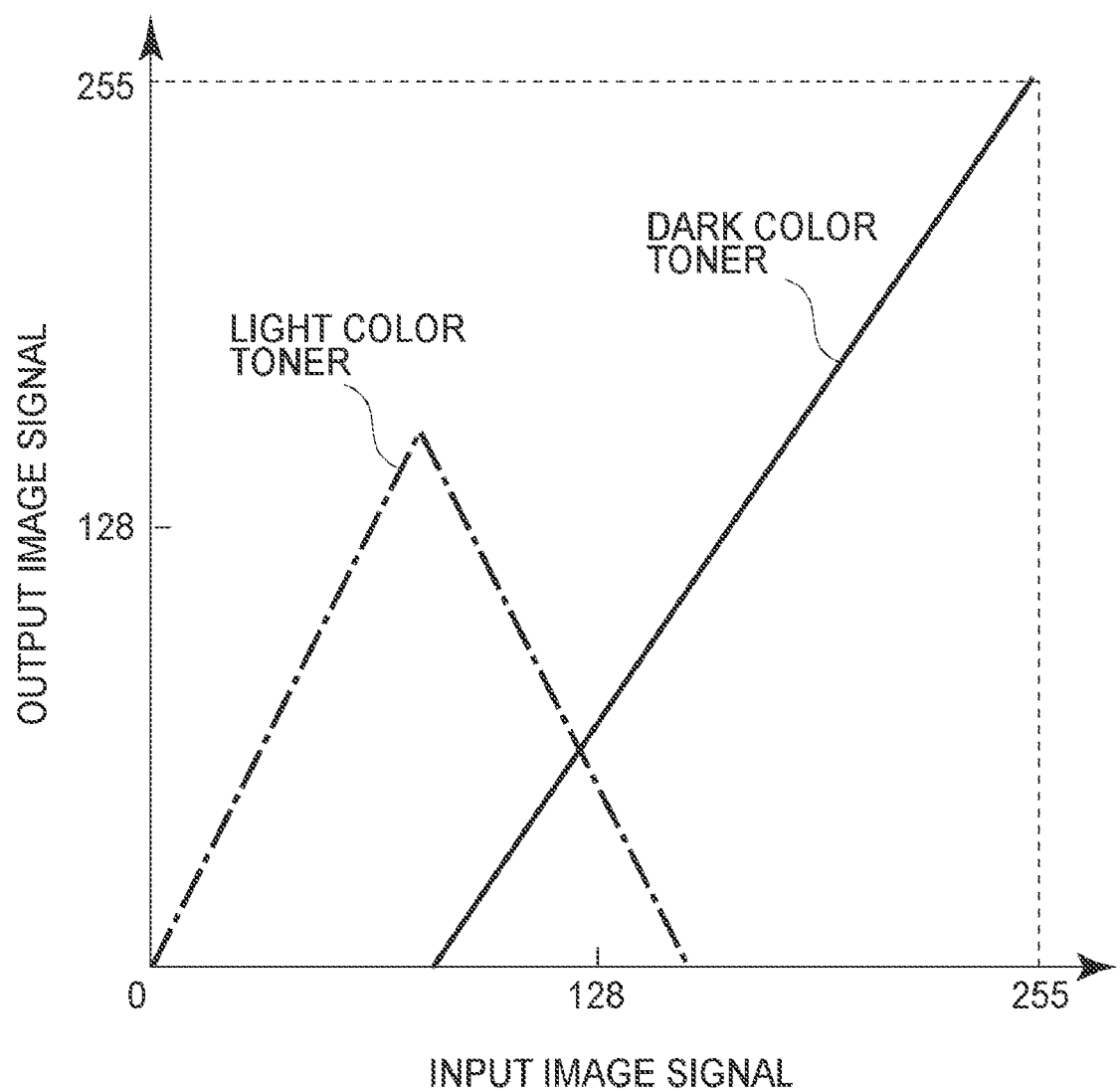

Further, the color conversion table for color separation into the dark color toner and the light color toner as shown in FIG. 8 may also be configured to change depending on the image data (to be provided in a plurality of color conversion tables) By this, e.g., it is possible to change the color conversion table for the dark color toner and the light color toner depending on whether the image data obtained through the image processing (F2) is a halftone image (photographic image or the like) or a character (letter) image. For example, the color conversion table of FIG. 8 is used as a color conversion table for the halftone image and a color conversion table of FIG. 9 is used as a color conversion table for the character image and depending on whether the image data is that for the halftone image or that for the character image, a constitutional ratio between the dark color toner and the light color toner is changed. That is, it is suitable that an image data for increasing an amount of use of the light color toner with respect to the halftone image as shown in FIG. 8 is prepared to improve the tone gradation and an image data for increasing an amount of use of the dark color toner with respect to the character image as shown in FIG. 9 is prepared to provide a clear character image.

Here, in the case of using only the dark color toner, it is not necessary to perform the color conversion of the dark color toner image signal into those for the dark color toner and the light color toner, so that the input image signal is equal to the output image signal. As a result, it is possible to omit the color conversion table as shown in FIG. 8 or FIG. 9.

[Forgery-Preventing Pattern]

Next, a forgery preventing pattern will be described. The forgery preventing pattern (image) in this embodiment refers to those as a special pattern which is printed on a background and appears as a character or an image when copied, in order that an original image on receipts, bills and certificates is not easily copied from the viewpoint of security. This special pattern achieves an effect of deterring (suppressing) copying of an original by making a contrivance to prevent the original from being easily copied by copying, although the effect is psychological. The forgery preventing pattern image includes a background portion at which an image disappears (is not emphasized) when copied and a latent image portion at which the image does not disappear even when copied, thus appearing as a visible image (being emphasized).

As a system of an image forming apparatus for establishing the forgery-preventing pattern, e.g., there is the following system. That is, when a dot size at a background portion of an outputted original is smaller than a reading limit of a render, an image at the background portion disappears after copying.

More specifically, a mechanism of a copying machine for establishing the forgery-preventing pattern will be described.

Figure 36:
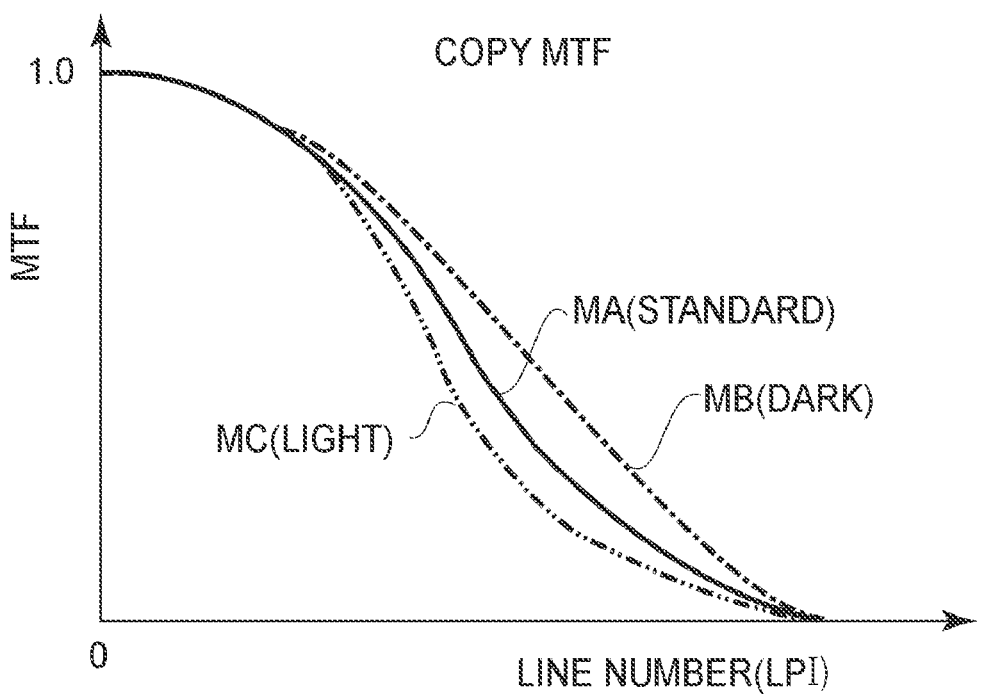
FIG. 36 is a graph showing an embodiment of a copy MTF (modulation transfer function).

A solid line MA in FIG. 36 shows a copy resolving power (copy MTF) of an ordinary copying machine. When a line number (LPI (line per inch)) as one of frequency information is taken as an abscissa and a contrast (intensity) is taken as an ordinate, a high-frequency area cannot be reproduced. This phenomenon is attributable to factors such as a reader MTF during copying, an image processing method, halftoning, resolving power for image formation, and so on, but a tendency of the copy MTF is the same among manufacturers and is such that a higher frequency component exhibits a lower copy reproducibility. Herein, the line number refers to a minimum value of a distance between centroids of isolated dots in the case of forming an image. In the case where the image is formed with concentrated dots, a distance between centroids of adjacent isolated dots is constant, so that the line number equals to the distance between the centroids of the isolated dots. A larger line number provides a smaller dot spacing and a smaller line number provides a larger dot spacing. Thus, when the spacing between the isolated dots is excessively small, a margin sandwiched between the isolated dots and the adjacent isolated dots affect each other, so that a contour of the isolated dot is read by the reader so as to be blurred (decreased in density).

For example, it is also possible to cause the entire forgery-preventing pattern portion or the entire background portion to disappear during copying by operating a density adjusting portion of the copying machine. In the case of adjusting the density to a larger density as indicated by alternate long and short dashed lines MB shown in FIG. 36, a reproducibility on the higher line number side is improved (i.e., a lowering in density of the copied original is small). In the case of adjusting the density to a smaller density as indicated by a chain double-dashed line MC shown in FIG. 36, a reproducibility on the lower line number side is lowered (i.e., the lowering in portion of the copied original is large).

As described in Japanese Patent Publication (JP-B) Sho 58-47708, it is possible to form a forgery-preventing pattern image by selecting balanced special frequency and density area (Dot %) so as to leave a latent image portion by causing a background portion to disappear during copying.

In this embodiment, an image forming system for establishing the forgery-preventing pattern is formulated by adjusting the reader MTF (reading resolution of the reader). For example, when the reader MTF is 300 lpi, a resolution (resolving power) of about 0.5 or less is recommended and is set to 0.5. In this case, dots disappear after copying when the line number at the background portion is about 200 lpi or more and remain after copying when the line number at the latent image portion is about 80 lpi or less. For this reason, in this embodiment, the line number if 206 lpi at the background portion and 60 lpi at the latent image portion. A method of changing the reader MTF is also described in JP-A Hei 11-191830. Further, the forgery-preventing pattern image can also be formed by changing a degree of concentration of dots. Concentrated dots and dispersed dots can be formed by dithering using dither matrixes different in line number and feature.

In order to obtain a concentrated dot arrangement in the dithering using the dither matricies, a dot concentration type dither matrix (JP A Hei 05 167810) may be used. Further, in order to obtain a dispersed dot arrangement, a dot dispersion type dither matrix (JP A 2003 291468) may be used.

In the case of forming the forgery-preventing pattern image by using the above-described dithering, low line number dot processing is suitable for the latent image portion and high line number dot processing is suitable for the background portion. Further to say, dithering using the dot concentration-type dither matrix is suitable for the latent image portion and dithering using the dot dispersion-type dither matrix is suitable for the background portion. In the dot concentration-type dither matrix, as described in JP-A Hei 11-331621, the line number is determined by a period which is called a sub-matrix in the dither matrix. On the other hand, in the dot dispersion-type dither matrix, dots are dispersed in a sub-matrix, so that a resultant image is a high-resolution image. In the dot dispersion-type dither matrix, in order to change the density, a dot size is decreased and kept at a constant level to increase the number of dots. That is, when the dot dispersion-type dither matrix has the line number of 600 lpi, one dot and one space constitute a minimum interval, so that 300 lpi is a maximum line number (except for the case of adjacent dots with no space).

In this embodiment, an image corresponding to the background portion is designed so that dots are discretely disposed by using the dot dispersion-type dither matrix and an image corresponding to the latent image portion is designed so that dots are concentratedly disposed by using the dot concentration-type dither matrix.

Generally, with respect to the copying machine, there is a limitation of an image reproducing ability depending on an input resolution for reading minute dots of an original for copying and an output resolution for reproducing the minute dots. Accordingly, when isolated minute dots exceeding a limit of an input or output image reproducing ability of the copying machine are present in the original, in a copy thereof, the minute dots cannot be completely reproduced, so that the isolated minute dot portion disappears.

Specifically, concentrated large dots having a small line number can be reproduced by copying. However, concentrated dots having a large line number or dispersed dots having a large line number is less liable to be reproduced. By this, such a phenomenon that a hidden image (latent image) appears occurs. Further, even when the dispersed dots do not disappear by copying, the hidden image (latent image) appears also in such a case that there is a clear difference in density compared with the concentrated dots (density difference between the latent image portion and the background portion).

(1) Camouflage Technique

Further, with respect to the forgery-preventing pattern, a technique called "camouflage" by which a hidden character or image (latent image) is less liable to be discriminated is also well known. This camouflage technique is a method in which a pattern different in density from the latent image portion and the background portion is disposed over the entire forgery-preventing pattern image. According to the camouflage technique, it is possible to achieve such an effect that at first glance, the camouflage pattern different in density from the latent image portion and the background portion is macroscopically conspicuous, thus placing the latent image in a further inconspicuous state.

Further, compared with a forgery-preventing pattern with no camouflage pattern, the forgery-preventing pattern on which the camouflage pattern is present has also an effect of making a decorative impression on a print. It is desirable that dots in this camouflage pattern disappear after copying as much as possible in order that the latent image can be easily discriminated after the copying. In a simplest case, the camouflage can be realized by omitting dots at a portion corresponding to the camouflage pattern.

(1) Reader Resolution and MTF

It can be said that the resolution is a numerical value representing that how in a small area image information can be exchanged by a signal. On the other hand, it can be said that the resolution is a numerical value representing that how much of a reading ability is actually present or how much of a copy reproducing ability is actually present. For this reason, the resolution of the reader and an MTF (resolving power) of the reader are not always coincide with each other. For example, when a high-definition chart is read by a reader (resolution: 600 dpi), in many cases, the reader provides a contrast ratio of approximately 0.3-0.5 with respect to a pattern of 300 lpi. Herein, the contrast ratio means, when a difference in readout value between square white and black patches each of about 2 cm on a side is taken as 1, a contrast ratio of a desired line (a ratio of a contrast of the 300 lpi pattern to a contrast of the square white and black patches each of about 2 cm on a side). As the contrast ratio is lowered, the resultant image is blurred. The above mentioned value of 300 lpi corresponds to a pattern one pixel line and one pixel space with the resolution of 600 dpi. With respect to the contrast value of 0.3, when binary-coded processing is performed by the dithering, the above-described pattern does not appear (both of the line and the space are outputted as a white image or a black image). Also from this fact, it can be understood that the resolution and the MTF (resolving power) are different from each other.

The high-definition chart can be prepared by DDCP ("Digital Konsensus Pro" or the like, mfd. by Konica Minolta Graphic Imaging Japan Co., Ltd.) for forming a 600 dpi-pattern of one pixel line and one pixel space with white and black completely. Further, it is also possible to prepare the high-definition chart by a film setter ("GENASETT" or the like, mfd. by Dainippon Screen Mfg. Co., Ltd.).

As a unit of the resolving power (MTF) with respect to a frequency is defined as lines per inch but may also be defined as lines per mm. Further, vertical and horizontal MTF characteristics are also important, so that a forgery-preventing pattern effect is less liable to be achieved in, e.g., a system in which MFT is high with respect to one of the MTF characteristics.

(3) Forgery-Preventing Pattern Density

In the case where the background portion is formed by using the dot concentration-type dither matrix, even with the same line number, an image is required to be formed with small dots to some extent in terms of a dot size (dot diameter). This is because even in the case where the isolated dots cannot be reproduced due to the MTF characteristics of the reader, when a macroscopic density D exceeds 0.25, the density is reproduced on a copied original. That is, the density at the background portion is increased, so that a difference between the background portion and the latent image portion is less distinguishable. Therefore, at the background portion, the density D is recommended to be 0.25 or less. In this case, a dot areal ratio (100% for a solid image) varies depending on a type of the copying machine but is 25% or less in many cases. Incidentally, the density D is a visual density measured with a light source for STATUS A.

(4) Resolving Power Characteristic (MTF Characteristic)

As described above, with respect to the copying machine, there is a limitation of an image reproducing ability depending on an input resolution for reading minute dots of an original for copying and an output resolution for reproducing the minute dots. Accordingly, when minute dots exceeding a limit of the image reproducing ability of the copying machine are present in the original, in a copy thereof, the minute dots cannot be completely reproduced. With respect to this characteristic, the MTF characteristic of the reader is dominant. Further to say, a glass material characteristic (a degree of polishing, a material characteristic, or the like) of a lens of flatness of a mirror affects field curvature, chromatic aberration, an increase in diffused light, permeability, etc., thus determining an MTF as a final resolving power characteristic.

A higher MTF (higher contrast ratio on a high line number side) is not necessarily better. An original for the copying machine is a dot original (for a printer or a general-purpose offset print) in many cases, so that in the case where dots are faithfully read, moire is caused to occur by interference through the dithering on the printer side during output. That is, a reader MTF characteristic with moderate blurriness is optimum for the copying machine. For this reason, with respect to a pattern with 300 lpi, the contrast ratio is about 0.3-0.5.

Thus, when lines or dots are blurred, they disappear through ordinary dithering or use of γ lookup table (LUT) or are reproduced with a size smaller than that of dots for the original.

Further, a standard mode of the copying machine is designed to remove a background of an original. When the original is intended to be faithfully reproduced, a color, cockle, curl, crease, and the like of paper for the original are also reproduced (the paper is colored), thus resulting in a lowered image quality. Further, toner is used at an unnecessary portion, so that there is no advantage also in terms of running cost. This background removal function is realized by optimizing a one-dimensional table, for input and output, called y LUT (so as to less create highlight). This function is used, e.g., in the case where setting for copying a news paper is effected so that only characters are copied and gray of a background of the newspaper is removed (made white).

Next, a method of forming the forgery-preventing pattern image by the image forming apparatus will be described more specifically.

Hereinafter, a dither matrix used for image formation at the background portion is referred to as a "background dither matrix" and a dither matrix used for image for formation at the latent image portion is referred to as a "latent image dither matrix".

The dither method is a method in which a multi-valued output image signal is compared with a threshold calculated according to a certain rule to output a binary image on the basis of a magnitude correlation therebetween. The dither matrix is a threshold matrix in which threshold values at the time of binarizing the output image signal by the dithering.

The binary image (threshold pattern) is obtained by subjecting a pixel value of the output image signal to binarization with a corresponding threshold of the dither matrix. In the case where a tone gradation value of the output image signal is less than the threshold of the dither matrix, a pixel value for the resultant binary image is assigned with one of bits (e.g., 1). In the case where the value is not less than the threshold, the pixel value is assigned with the other bit (e.g., 0).

In the following description, a binary image constituting the background portion is referred to as a "background transfer roller" and a binary image constituting the latent image portion is referred to as a "latent image threshold pattern".

In this embodiment, a combination of a background which are patterns (binary images) constituting the background portion and the latent image portion so that densities at the background portion and the latent image portion during formation of the forgery-preventing pattern are equal to each other is determined in advance. Then, a logical operation is performed by using the background threshold pattern, the latent image threshold pattern, a latent image/background area designating image as a binary image for designating the background portion and the latent image portion, and a camouflage area designating image as a binary image for designating a camouflage area. By this, it is possible to form the forgery-preventing pattern image at high speed and with memory saving.

Incidentally, the background threshold pattern and the latent image threshold pattern are parameters for determining the density of the forgery-preventing pattern image at the background portion and the latent image portion during the formation of the forgery-preventing pattern image and are specific constitutional elements of a "forgery-preventing pattern parameter".

Figure 10:
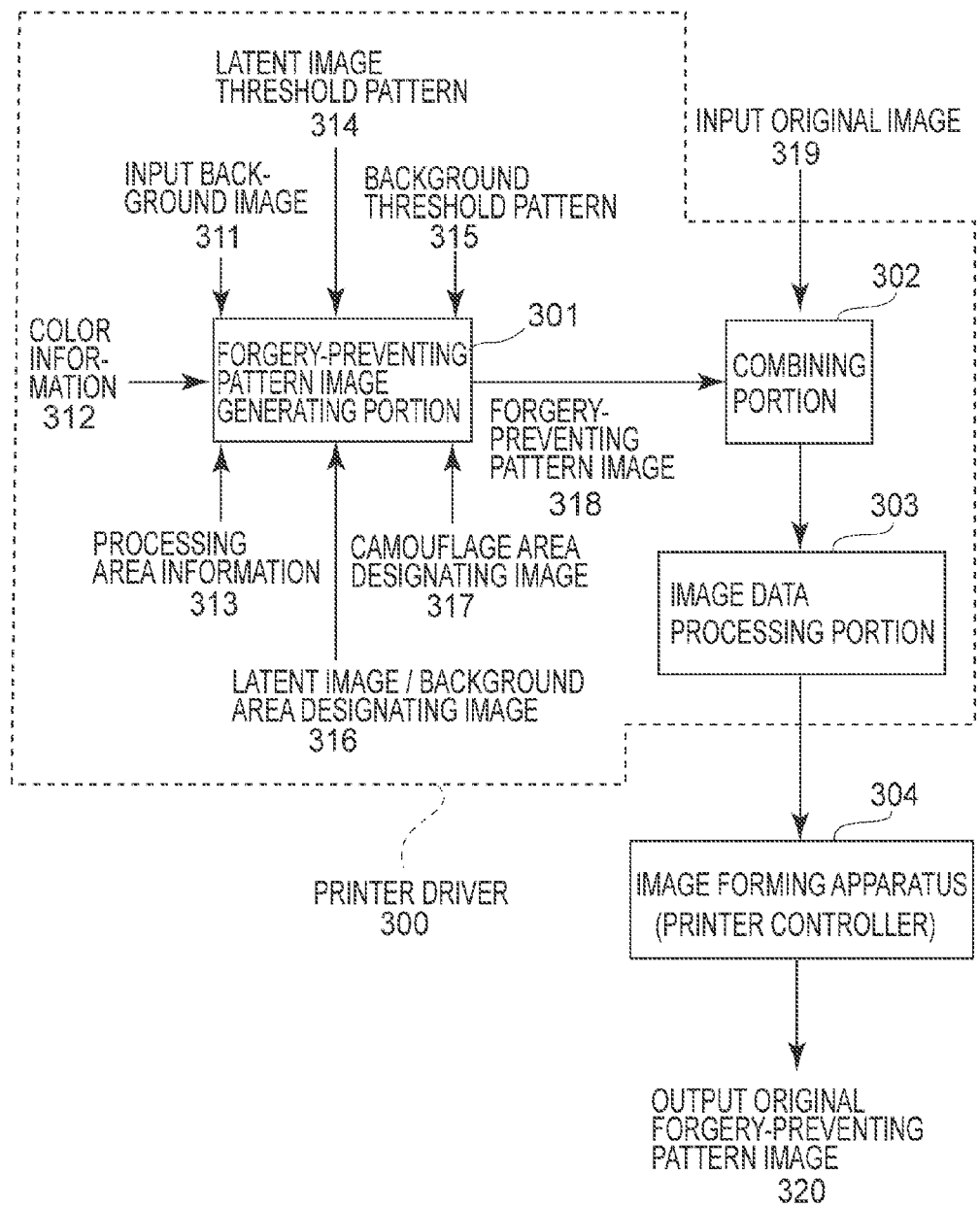
FIG. 10 is a block diagram showing an embodiment of internal processing of forgery-preventing pattern image formation.

FIG. 10 is a block diagram showing internal processing of forgery-preventing pattern formation during printing in this embodiment. This forgery-preventing pattern formation is performed by a processing block group constituted by including a forgery-preventing pattern image forming portion 301, a combining portion 302, and an image data processing portion 303 in a printer driver 300 and an image forming apparatus 304. The printer driver 300 is provided, e.g., as an attachment to the image forming apparatus 304 in order to output an image from the image forming apparatus 304 and is an application software to be installed in each of computers communicatably connected to the image forming apparatus 304.

First, into the forgery-preventing pattern forming portion 301, an input background image 311, color information 312, processing area information 313, a latent image threshold pattern 314, a background 315, a latent image/background area designating image 316, and a camouflage area designating image 317 are inputted. Then, a forgery-preventing pattern image 318 is formed at the forgery-preventing pattern image forming portion 301 and outputted therefrom.

The forgery-preventing pattern image forming portion 301 effects image processing of the input background image 311 in accordance with a predetermined rule to form the forgery-preventing pattern image 318. Incidentally, the input background image 311 may be a multi-valued image or a binary image. Further, the processing area information 313 is information, of input image information, for indicating an area for performing embedding of the forgery-preventing pattern.

The latent image/background area designating image 316 is an image for designating the latent image portion and the background portion and is constitute in a one pixel=one bit basis. One of bits of the latent image background area designating image 316 (e.g., 1) represents the latent image background and the other but (e.g., 0) represents the background portion. The camouflage area designating image 317 is an image for designating an area for decreasing the density in order to achieve a camouflage effect and is constituted in a one pixel=one bit basis similarly as in the case of the latent image/background area designating image 316. One of bits of the camouflage area designating image 317 (e.g., 1) represents that the area is not the camouflage area and the other bit (e.g., 0) represents the camouflage area in which the portion is decreased compared with that in its surrounding area.

Figure 11:
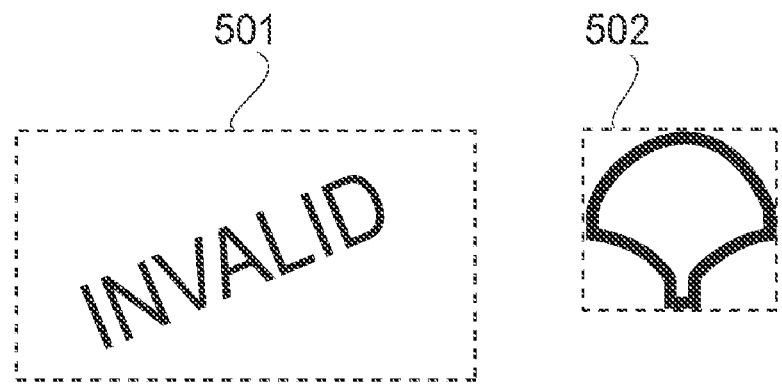
FIG. 11 is a schematic view showing an embodiment of a latent image background area designation image and a camouflage area designation image.

FIG. 11 includes views showing an embodiment of the latent image/background area designating image 316 and an embodiment of the camouflage area designating image 317. In FIG. 11, an image 501 is the embodiment of the latent image/background area designating image 316 and an image 502 is the embodiment of the camouflage area designating image 317.

As already described above, the latent image threshold pattern 314 and the background threshold pattern 315 are formed by subjecting proper image signals to threshold processing with the latent image dither matrix and the background dither matrix, respectively, so as to be outputted as patterns having an equal density during print output.

Figure 12:
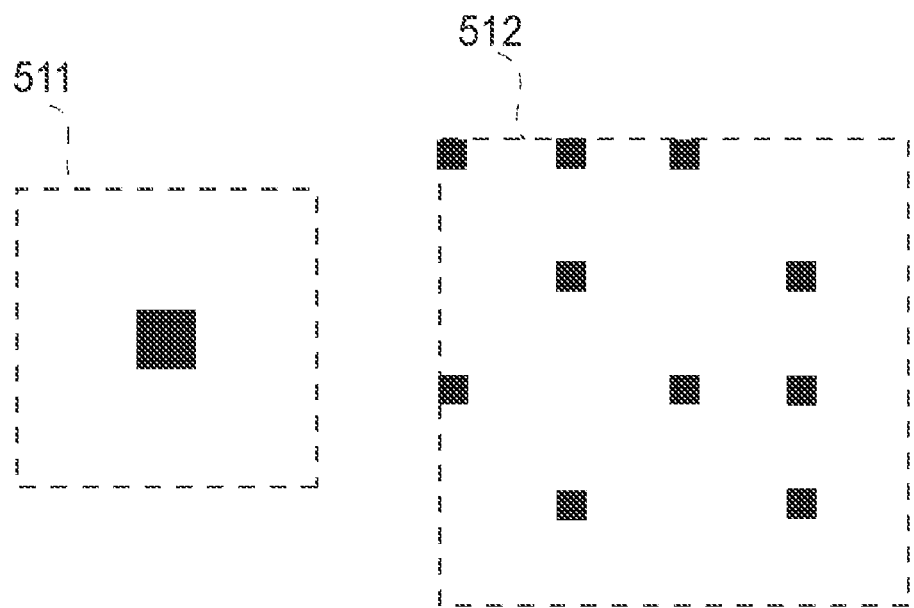
FIG. 12 is a schematic view showing an embodiment of a latent image threshold pattern and a background threshold pattern.

FIG. 12 includes views showing an embodiment of the latent image threshold pattern 314 and an embodiment of the background threshold pattern 315. In FIG. 12, a pattern 511 represents the embodiment of the latent image threshold pattern 314 and a pattern 512 represents the embodiment of the background threshold pattern 315.

Next, the forgery-preventing pattern image 318 formed at the forgery-preventing pattern image forming portion 301 is outputted to the combining portion 302.

At the combining portion 302, an input original image (actual image) 319 as an image prepared by an application software for the computer or the like and the above formed forgery-preventing pattern image 318 are combined to form a "forgery-preventing pattern combined output original image". Incidentally, in the case where the forgery-preventing pattern image is outputted as the forgery-preventing pattern combined output original image as it is irrespective of the input original image 319, it is not necessary to refer to the input original image 319 at the combining portion 302. In this case, color matching processing may be performed for each of objects constituting the forgery-preventing pattern image 318 and the input original image 319 and thereafter the object constituting the input original image 319 and the forgery-preventing pattern image 318 may be combined. By this, it is possible to execute the color matching with respect to the forgery-preventing pattern combined output original image.

Next, at the image data processing portion 303, the forgery-preventing pattern combined output original image combined at the combining portion 302 is received as drawing information and converts it into a print command one by one. In this case, as desired, image processing such as the color matching processing, RGB-YMCBk conversion, halftone processing, or the like is performed. Then, the image data processing portion 303 sends a "forgery-preventing pattern combined output original image data" in data format (e.g., data format described by page description language or data format expanded into a print bitmap) interpretable by the image forming apparatus 304 to the image forming apparatus 304 as a subsequent stage.

The image forming apparatus 304 is the above-described monochromatic or color image forming apparatus and outputs an output original forgery-preventing pattern image 320 in accordance with information of the inputted forgery-preventing pattern combined output original image data.

Here, when description is made by taking the case of a printer as an example, the image forming apparatus 304 is constituted by including an unshown printer controller and an unshown printing engine. The printer controller effects the above-mentioned processing described with reference to FIG. 6. The printer controller analyzes a page description language (PDL) sent from a personal computer or the like and with respect to commands for drawing and printing, expands corresponding patterns into a page memory. Here, as desired, image processing (F2) such as RGB-YMCBk conversion, halftone processing, or the like is performed. Then, the contents of the page memory are converted into a video signal, which is outputted by a printer engine designed for each of the image forming apparatuses described with reference to FIGS. 1-4.

Figure 13:
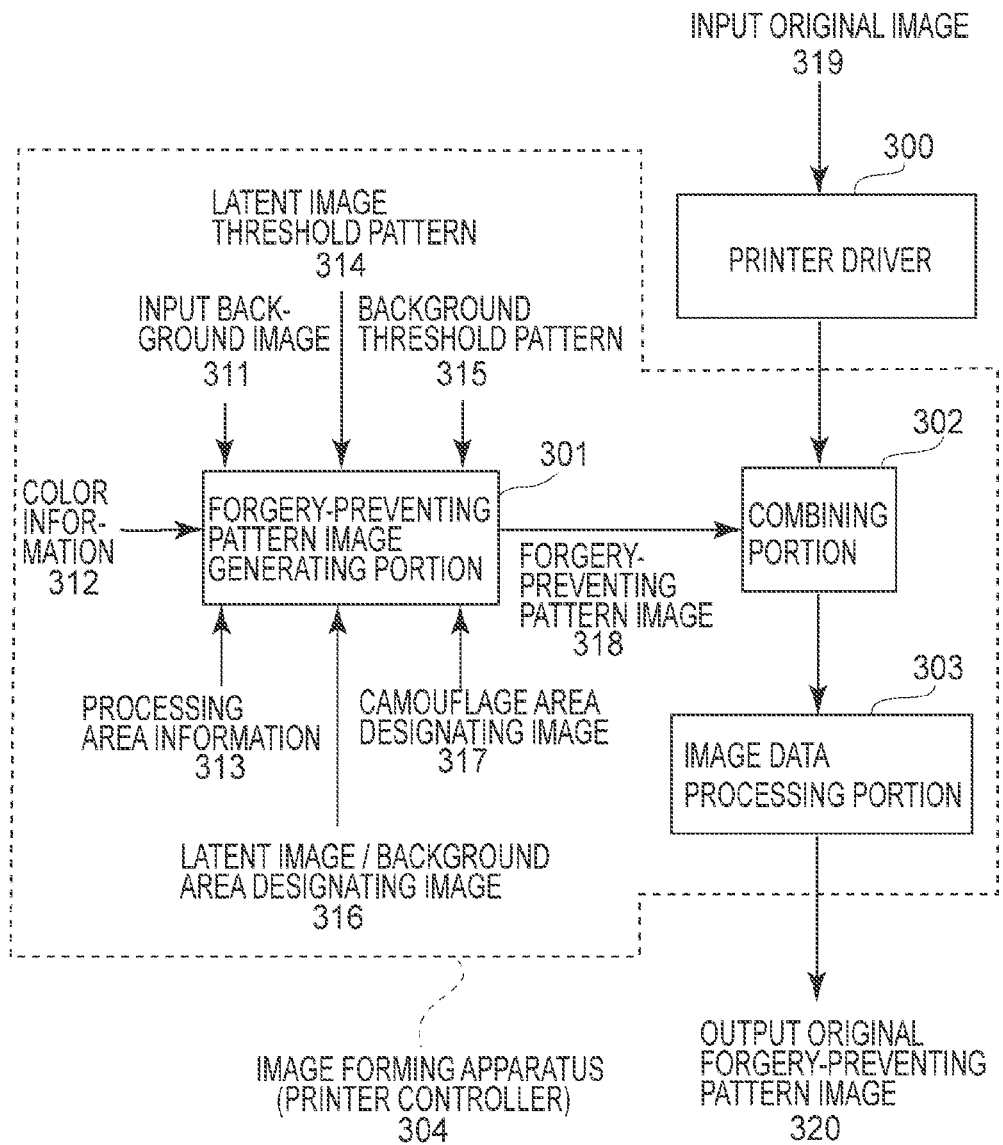
FIG. 13 is a block diagram showing another embodiment of internal processing of forgery-preventing pattern image formation.

FIG. 13 is a block diagram showing internal processing of forgery-preventing pattern formation during copying in this embodiment. This forgery-preventing pattern formation is performed by a processing block group constituted by including a printer driver 300, and a forgery-preventing pattern image forming portion 301, a combining portion 302, and an image data processing portion 303 of an image forming apparatus 304. A difference in constitute from that during the printing is that the forgery-preventing pattern image forming portion 302, the combining portion 302, and the image data processing portion 303 are mounted in a printer controller in the image forming apparatus 304 but the forgery-preventing pattern formation during copying is basically performed similarly as in the case of that during the printing.

A forgery-preventing pattern image 318 formed at the forgery-preventing pattern image forming portion 301 as an input portion into which forgery-preventing pattern information is inputted is outputted to the combining portion 302.

At the combining portion 302, the formed forgery-preventing pattern image 318 and an input original image 319 as an image obtained by reading an original image (actual image) by an image reading means using a solid-state image pick-up device such as a CCD or the like at an unshown reader portion (image reading means) are combined. By this, the combining portion 302 forms a forgery-preventing pattern combined output original image. Incidentally, in the case where the forgery-preventing pattern image 318 is used as the forgery-preventing pattern combined output original image as it is irrespective of the input original image 319, it is not necessary to refer to the input original image 319 at the combining portion 302.

Next, at the image data processing portion 303, the forgery-preventing pattern combined output original image is subjected to image processing (F2) as shown in FIG. 6 such as color matching processing, RGB-YMCBk conversion, halftone processing, or the like. Then, the image data processing portion 303 outputs an output original forgery-preventing pattern image 320 in accordance with information on the inputted forgery-preventing pattern combined output original data.

In this embodiment, the printer controller 304 also functions as an image processing apparatus for outputting an image to the image forming apparatus on the basis of image information on the inputted forgery-preventing pattern image. In this case, on the basis of an output from the printer controller 304, a forgery-preventing pattern image is formed by an unshown printer engine as the image forming apparatus. Then, the forgery-preventing pattern image is controlled by the printer controller 304 as a control portion so as to be subjected to image formation with a light color toner.

(5) Flow Chart

Next, the internal processing of the forgery-preventing pattern formation will be described more specifically with reference to FIG. 14.

Figure 14:
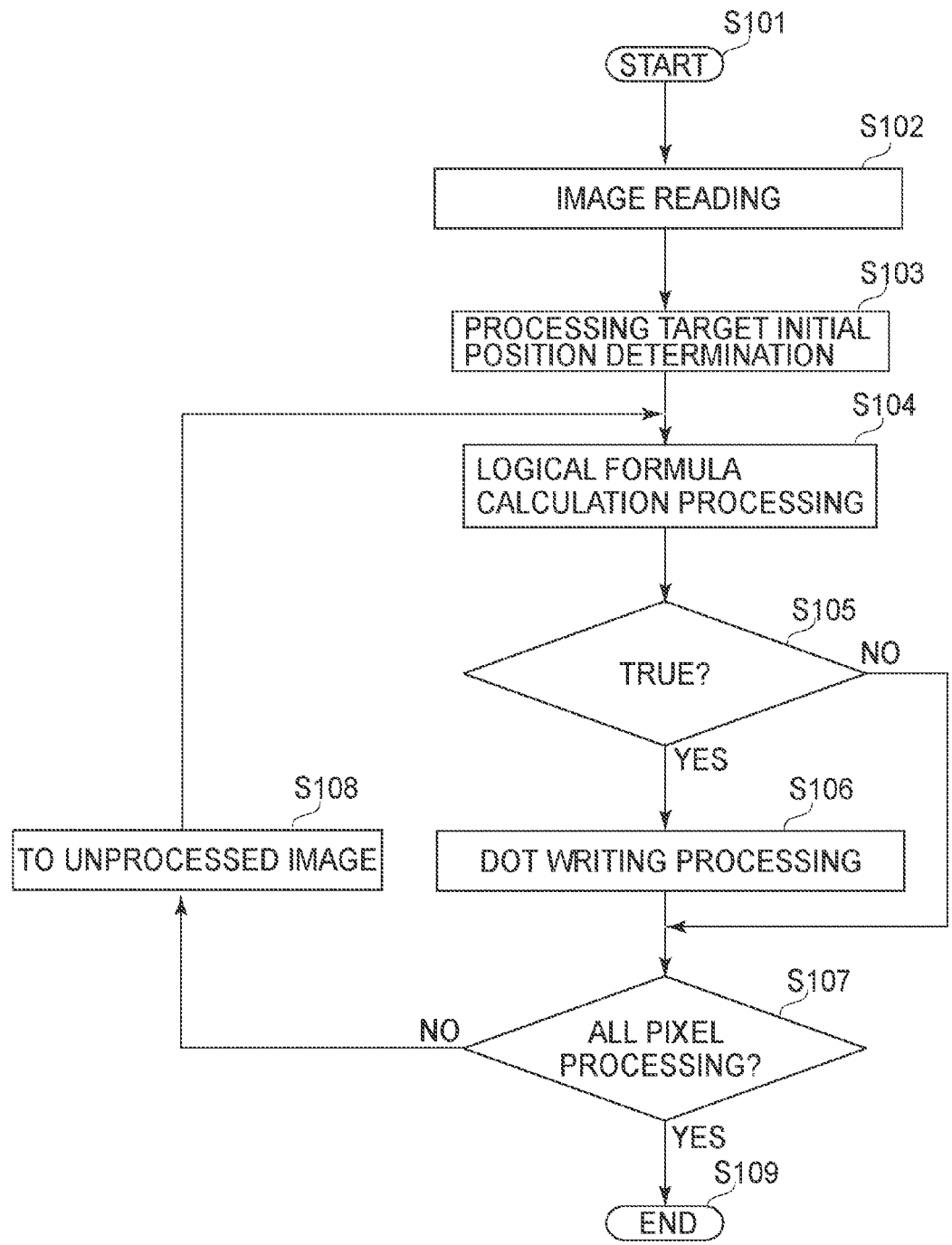
FIG. 14 is a flow chart showing an embodiment of internal process steps of a forgery-preventing pattern image forming portion.

FIG. 14 is a flow chart showing internal process steps at the forgery-preventing pattern image forming portion 301 in this embodiment.

First, through a user interface or the like, in step S101, forgery-preventing pattern image formation processing is started. Next, in step S102, an input background image 311, a latent image threshold pattern 314, a background threshold pattern 315, a latent image/background area designating image 316, and a camouflage area designating image 317 are read.

Next, in step S103, an initial pixel during formation of the forgery-preventing pattern image is determined. For example, with respect to the entire input background image, in the case where image processing is performed in the order of raster scanning from an upper left position to a lower right position to change the input background image into a forgery-preventing pattern image, the upper left position is determined as an initial position.

Next, in step S104, processing shown below is performed so that the latent image threshold pattern 314, the background threshold pattern 315, the latent image/background area designating image 316, and the camouflage area designating image 317 are disposed from the upper left position of the input background image 311 in a tile-like shape. That is, with respect to a pixel of the input background image 311 to be processed, judgment is made as to whether or not a pixel value with respect to a dot during output is written by predetermined logical formula calculation. In this case, the pixel value corresponds to color information 312.

Further, in the forgery-preventing pattern image to be formed, an image having a size corresponding to the least common multiple of lengths in a row direction and a column direction of the latent image 314, the background threshold pattern 315, the latent image/background area designating image 316, and the camouflage area designating image 317 constitutes a minimum repeating unit. For that reason, at the forgery-preventing pattern image forming portion 301, only a portion of the minimum repeating unit of the forgery-preventing pattern image is formed and the formed portion of the forgery-preventing pattern image is repeatedly arranged in a tile-like shape in a size of the input background image 311, so that a processing time required for forming the forgery-preventing pattern 318 can be reduced.

Next, in step S105, a calculation result in the step S104 is judged.

In the case where the pixel value is written in the step S104 (YES), in step S106, writing processing of a pixel value corresponding to a dot during output is performed. The pixel value can be changed depending on a color of the forgery-preventing pattern image. In the case where a black forgery-preventing pattern is intended to be prepared, the color of a pixel to be processed in the input background image 311 is set to a black. In addition, it is also possible to prepare a color forgery-preventing pattern image 318 by setting the color of the pixel to be processed to cyan, magenta, or yellow correspondence with the color of toner used in the image forming apparatus.

In the case where the input background image 311 is an image data of one to several bits per pixel, the pixel value may be represented by using an index color method. The index color method is an image data representation method in which an index is set with respect to color information frequently appearing in an objective color image and a value of each pixel is represented by the number of index indicating color information. For example, an index is set with respect to color information frequently appearing in an objective color image in such a manner that index 0 is white and index 1 is cyan, and the like. Further, the value of each pixel is represented by the number of index indicating color information in such a manner that, e.g., the first pixel value is a value for the index 1, the second pixel value is a value for index 2, and the like.

In the step S105, in the case where the pixel value is not written (NO), in step S107, judgment is made as to whether or not all the pixels in the area to be processed of the input background image 311 are processed. In the case where all the pixels in the area to be processed of the input background image 311 are not processed, the process goes to step S108 and an unprocessed pixel is selected and subjected to the processing in the steps S104 to S106. On the other hand, in the case where the processing with respect to all the pixels in the area to be processed of the input background image 311 is completed, the process goes to step S109, in which the image processing at the forgery-preventing pattern image forming portion 301 is ended.

By the above-described processing, it is possible to prepare the forgery-preventing pattern 318 obtained by subjecting the input background image 311 to the image processing.

(6) Dot Arranging Method

Next, a dot arranging method at the latent image P and the background portion in this embodiment will be described more specifically.

In this embodiment, the case where the latent image portion is formed based on the dot concentration-type dither matrix and the background portion is formed based on the dot dispersion-type dither matrix will be described.

Figures 15, 16:
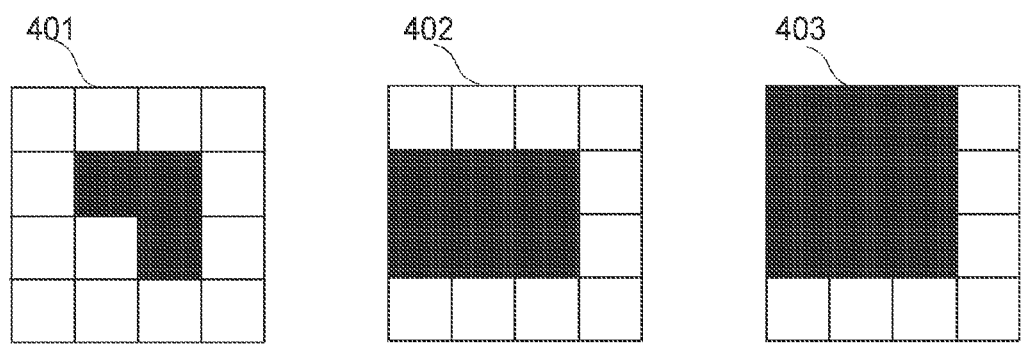
FIG. 15 is a schematic view showing embodiment of a 4×4 spiral dither matrix.
FIG. 16 is a schematic view showing threshold patterns (dot arrangements) obtained by subjecting a predetermined output image signal to threshold processing with use of the spiral dither matrix shown in FIG. 15.

A representative example of the dot concentration-type dither matrix used during formation of the latent image portion may include a spiral dither matrix. FIG. 15 is a schematic view showing an embodiment of 4×4 spiral dither matrix. Threshold values of the 4×4 spiral dither matrix are arranged in such a manner that a numerical value is increased from the center in a spiral fashion.

FIG. 16 includes schematic views each showing a threshold pattern (dot arrangement) obtained by subjecting a predetermined output image signal to threshold processing by using the 4×4 spiral dither matrix of FIG. 15. In FIG. 16, reference numerals 401, 402 and 403 represent threshold patterns obtained by subjecting output image signals 3, 6 and 9, respectively, to the threshold processing with respectively, to the threshold processing with the dither matrix of FIG. 15. The threshold patterns (dot arrangements) obtained in this embodiment are patterns in which the respective dots are concentratedly arranged.

Figures 17, 18:
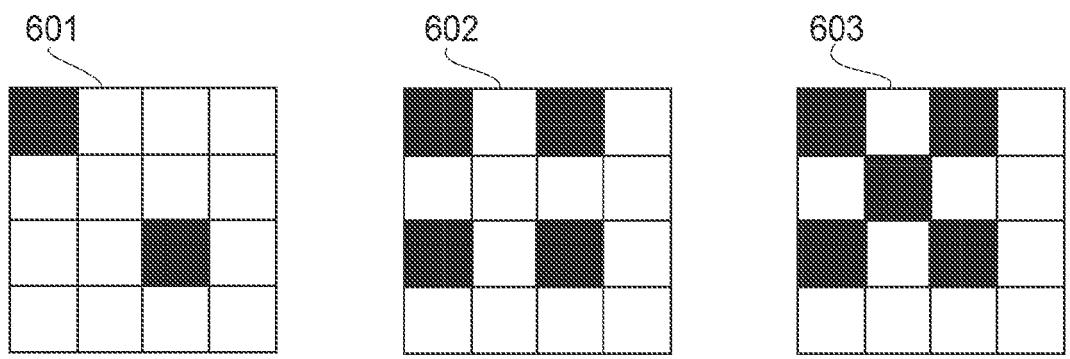
FIG. 17 is a schematic view showing embodiment of a 4×4 Bayer dither matrix.
FIG. 18 is a schematic view showing threshold patterns (dot arrangements) obtained by subjecting a predetermined output image signal to threshold processing with use of the Bayer dither matrix shown in FIG. 17.

On the other hand, a representative example of the dot dispersion type dither matrix used for forming the background portion may include Bayer dither matrix. FIG. 17 includes schematic views each showing an embodiment of 4×4 Bayer dither matrix. A threshold pattern formed by subjecting any output image signal to dithering with the Bayer dither matrix is designed so that the respective dots are arranged in a dispersion state.

FIG. 18 includes schematic views each showing a threshold pattern (dot arrangement) obtained by subjecting a predetermined output image signal to threshold processing by using a 4×4 Bayer dither matrix of FIG. 17. In FIG. 18, reference numerals (601, 602 and 603 represent threshold patterns obtained by subjecting output image signals 2, 4 and 5, respectively, to threshold processing with the dither matrix of FIG. 17. The resultant threshold patterns (dot arrangements) are patterns in which the respective dots are arranged in a dispersion state. In the Bayer dithering, when a size of the dither matrix is increased, a periodical texture (moire) due to the matrix can be conspicuous but at a specific tone gradation, there is an advantage that a periodical and beautiful pattern.

In this embodiment, the case of using the Bayer dither matrix as the dither matrix used at the background portion will be principally described. However, the dither matrix is not limited to that of Bayer-type but may also be other dot dispersion-type dither matrixes. For example, a blue-noise mask is also one of the dot dispersion-type dither matrixes. This mask has a blue-noise characteristic (a characteristic such that a pattern is locally nonperiodic and isotropic and less has a low frequency component) with respect to all the threshold patterns at any tone gradation and has a pixel distribution, for forming the threshold patterns, which is random but highly uniform, thus being in conspicuous in terms of graininess. For that reason, the mask has advantages that an occurrence of moire can be prevented and a visually preferable output pattern can be obtained. Further, it is also possible to employ a constitution of the background portion using an error diffusion method although this method is not a method using the threshold pattern. The error diffusion method has a disadvantage that it takes a long processing time but has an advantage that an image having a good visual sense property such that dots are uniformly dispersed.

Further, the threshold pattern for each tone gradation may not be formed based on the dither matrix. The background threshold pattern and the latent image threshold pattern may also be formed peculiarly for each tone gradation. In this case, there is also an advantage that a threshold pattern with a good image quality can be selected for each tone gradation.

Figure 19:
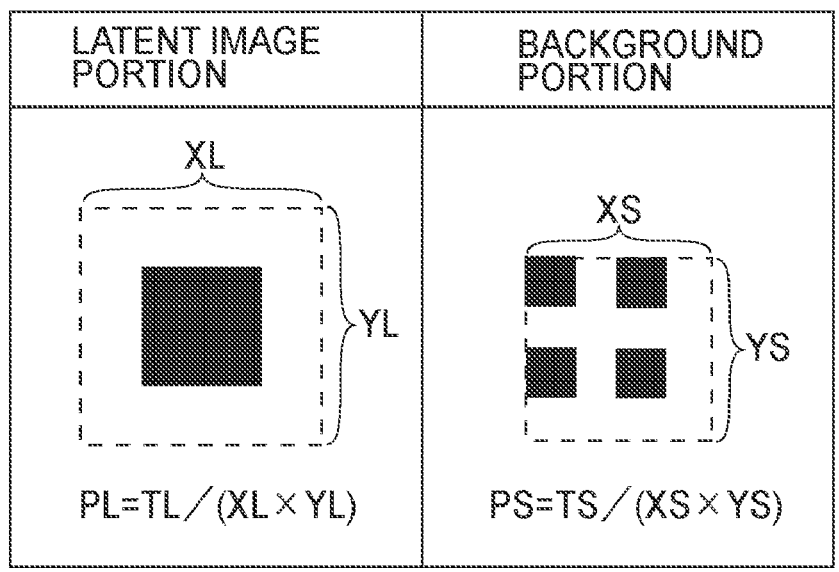
FIG. 19 is a schematic view for comparing an area ratio of a block pixel of a latent image threshold pattern with that of a background threshold pattern.

FIG. 19 is a schematic view for comparing area ratios of, e.g., black pixels in the latent image threshold pattern and the background threshold pattern. As shown in FIG. 19, vertical and horizontal dimensions of the latent image dither matrix and taken as YL and XL, respectively; a tone gradation of an output image signal is taken as TL; vertical and horizontal dimensions of the background dither matrix are taken as YS and XS, respectively; and a tone gradation of an output image signal is taken as TS. In this case, a ratio (PL) of the black pixel to the latent image threshold pattern is PL=TL/(XL×YL) and a ratio (PS) of the black pixel to the background threshold pattern is PS=TS/(XS×YS).

Figure 20:
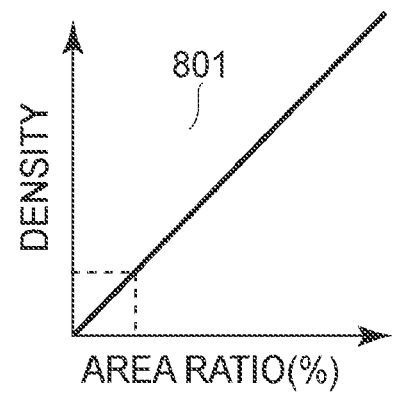
FIG. 20 includes graphs each showing a relationship between an area ratio, of a black pixel of a threshold pattern obtained by subjecting an output image signal to threshold processing with a dither matrix, and a density when the threshold pattern is outputted.
Figure 20:
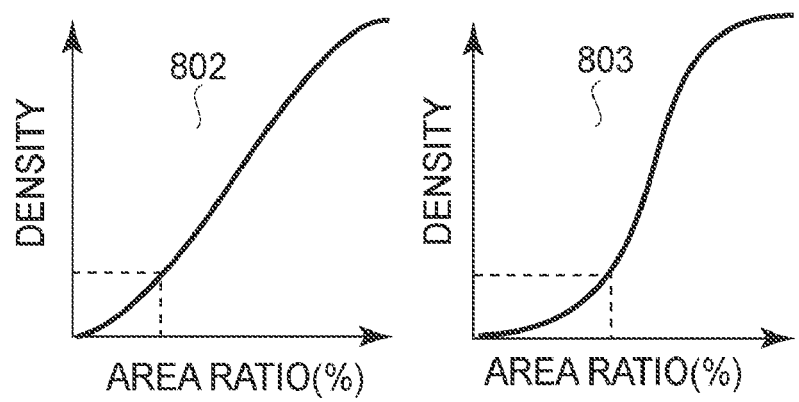

FIG. 20 includes graphs each showing a relationship between an area ratio, of the black pixel in a threshold pattern obtained by subjecting an output image signal to threshold processing with a dither matrix, and a density at the time of outputting the threshold pattern. Incidentally, in the dithering, the area ratio of the black pixel varies depending on the tone gradation of the output image signal, so that the abscissa in FIG. 20 may also be regarded as the tone gradation of the output image signal.

Here, the dither matrix of the latent image portion (the latent image threshold pattern) and the dither matrix of the background portion (the background threshold pattern) are not necessarily required to have the same side dimension but may have different side dimensions. For example, the case where the latent image dither matrix and the background dither matrix have the same tone gradation characteristic indicated by a reference numeral 801 is considered. In this case, irrespective of sizes of the latent image dither matrix and the background dither matrix, when values of the abscissa (area ratios of the black pixels) are substantially equal to each other irrespective of sizes of the dither matrix of the latent image portion and the dither matrix of the background portion, densities of the latent image threshold pattern and the background threshold pattern are substantially equal to each other. As a result, it is possible to form a forgery-preventing pattern image with an inconspicuous image. Here, the wording "values of the abscissa (area ratios of the black pixels) are substantially equal to each other irrespective of sizes of the dither matrix of the latent image portion and the dither matrix of the background portion" corresponds to that values of the tone gradations TL and TS such that PL and PS are substantially equal to each other are used.

However, actually, due to the characteristic of the image forming apparatus, the tone gradation characteristics of the latent image dither matrix and the background dither matrix are not always equal to each other.

For example, the case where the tone gradation characteristic of the latent image dither matrix is represented by a moderate S-shaped curve 802 and that of the background dither matrix is represented by an abrupt S-shaped curve 803 is considered. In such a case, even when the area ratios of the black pixels of the latent image threshold pattern and the background threshold pattern are set to be substantially equal to each other, densities at the latent image portion and the background portion during output are not equal to each other.

By properly adjusting an output image signal for either one or both of the latent image portion and the background portion, it is possible to bring one of the densities near to the other density during output as close as possible.

Further, when the number of tone gradations representable by the latent image dither matrix or the background dither matrix is large, it is possible to finely adjust the density at the latent image portion or the background portion by adjustment of the tone gradation of the output image signal.

In the case where the latent image dither matrix is the dot concentration-type dither matrix as shown in FIG. 15, the dots are close to isolated dots when the tone gradation of the output image signal is not more than a certain level, so that the latent image portion is liable to disappear during copying. On the other hand, when the tone gradation of the output image signal exceeds the certain level, the dots are concentrated, so that a block of dots per se constituting the latent image is liable to be clearly recognized by eyes.

Accordingly, in the latent image dither matrix, it is preferable that available tone gradations of the output image signal are within a certain range. Further, in the dither matrix as shown in FIG. 15, even when the size of the dither matrix is changed, the substantially same concentrated dot arrangement can be obtained when tone gradations of output image signals are identical to each other. Therefore, it is also possible to change a density per unit area by changing the size (line number) of the dither matrix while keeping the output image signal tone gradation with respect to the latent image dither matrix at a constant level.

On the other hand, in the case where the background dither matrix is the dot dispersion-type dither matrix as shown in FIG. 17, it is possible to change the density while uniformly providing the dots as a whole by changing the tone gradation of the output image signal. Accordingly, it can be said that a wide tone gradation of the background dither matrix (i.e., a large size dither matrix) is excellent in density adjustment performance at the background portion.

Figure 21:
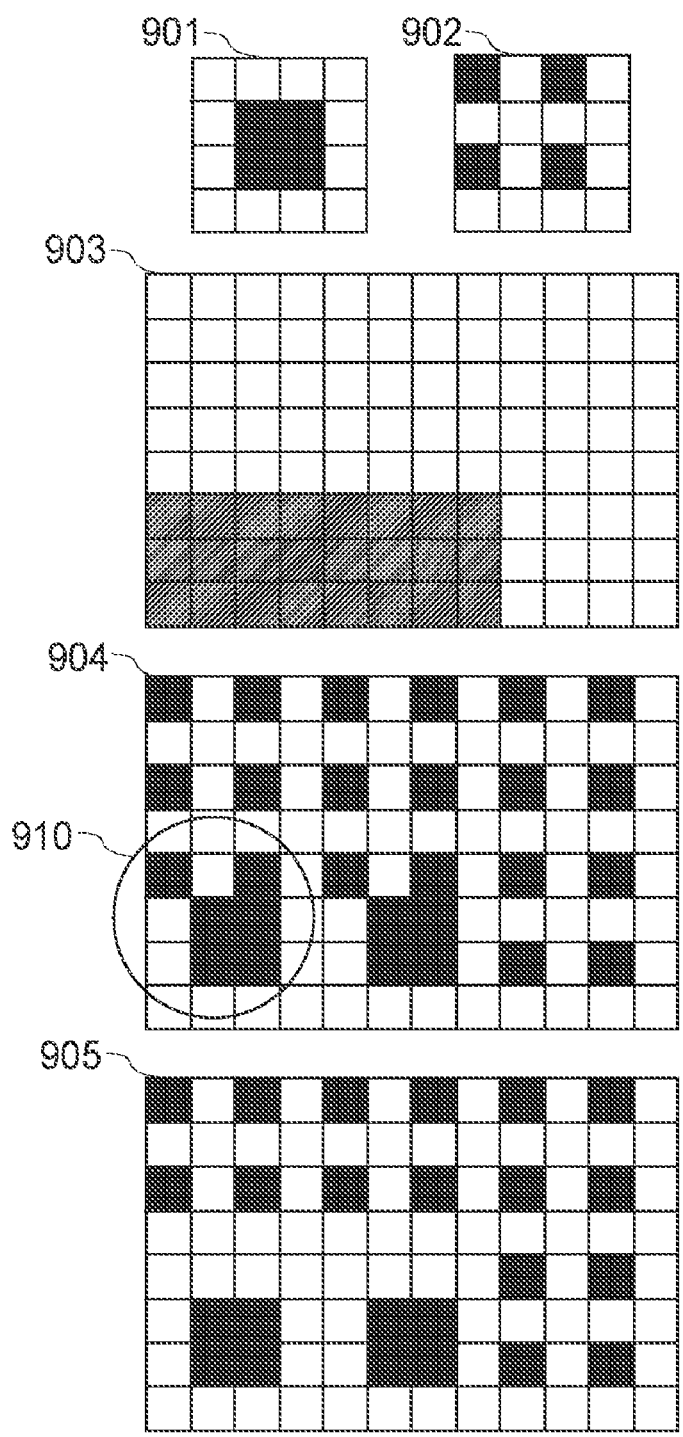
FIG. 21 includes schematic views showing an embodiment of a state in which a forgery-preventing pattern is formed at a forgery-preventing pattern forming portion.

FIG. 21 includes schematic views showing a state in which the forgery-preventing pattern is formed by the processing shown in the block diagram of FIG. 10 or 13. In FIG. 21, reference numerals 901, 902 and 903 represent a latent image threshold pattern, a background threshold pattern, and a latent image/background area designating image, respectively, and are a reference numeral 904 represents a formed forgery-preventing pattern image. Incidentally, in a forming stage of the forgery-preventing pattern image 904, a camouflage pattern is not introduced.

In the forgery-preventing pattern image 904 shown in FIG. 21, as shown by a circled area 910, a block of dots resulting from coalescence of the latent image threshold pattern and the background threshold pattern is formed at a switching portion between the latent image and the background. This block of dots is liable to be formed at the time when the switching between the latent image and the background in the latent image/background area designating image 903 and the size of the latent image threshold pattern are not synchronized with each other. Further, this block of dots concentratedly appears only at the switching portion between the latent image and the background in the latent image/background area designating image 903, so that such a disadvantage that an outer configuration of the latent image is conspicuous to reduce the effect of the forgery-preventing pattern can occur.

Accordingly, in order to form a high-quality forgery-preventing pattern image, it is preferable that at the switching portion between the latent image and the background in the latent image/background area designating image, a processing is performed so as not to form the block of dots. As an embodiment of the processing performed so as not to form the block of dots at the switching portion between the latent image and the background in the latent image/background area designating image, there is a boundary processing. When this processing is used, a white background is present at a peripheral portion of the black pixel of the latent image threshold pattern unless the peripheral portion is located at an end of the image. This white background constitutes a buffer zone, so that the black pixel of the latent image threshold pattern and the black pixel of the background threshold pattern do not contact each other. Thus, the switching portion between the latent image and the background designated in the latent image/background area designating image is prevented from being conspicuous. In FIG. 21, a reference numeral 905 represents a forgery-preventing pattern image subjected to the boundary processing. In the forgery-preventing pattern image 905, it is found that the block of dots resulting from coalescence of the latent image threshold pattern and the background threshold pattern at the switching portion between the latent image and the background is not formed. When the above-described boundary processing is performed at the forgery-preventing pattern forming portion 301, it is not necessary to prepare the latent image/background area designating image by synchronizing the switching portion between the latent image and the background designated in the latent image/background area designating image with the size of the latent image threshold pattern, thus resulting in ease of use by a user.

Figure 22:
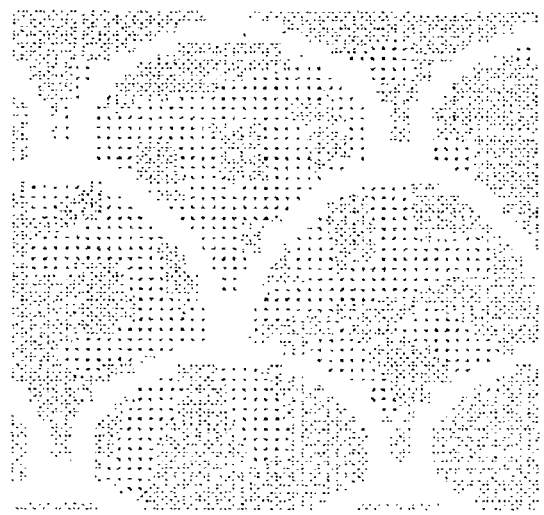
FIG. 22 is a schematic view, of a part of a forgery-preventing pattern image, showing an embodiment in which the forgery-preventing pattern image is formed at a forgery-preventing pattern forming portion by boundary processing.

FIG. 22 is a schematic view showing a part of the forgery-preventing pattern image formed at the forgery-preventing pattern forming portion through the boundary processing. When the forgery-preventing pattern image shown in FIG. 22 is formed, the images 501 and 502 shown in FIG. 11 are used as the latent image/background area designating image and the camouflage area designating image, respectively, and the images 511 and 512 shown in FIG. 12 are used as the latent image threshold pattern and the background threshold pattern, respectively. Incidentally, each of broken lines surrounding the images 501, 502, 511 and 512 represents a boundary of each image and is not present in an actual image. The forgery-preventing pattern image of FIG. 22 has been subjected to the boundary processing, so that such a phenomenon that the block of dots is formed at the boundary between the latent image portion and the background portion is not caused to occur. As a result, the latent image portion is less discriminatable.

Next, the processing at the combining portion 302 for combining the forgery-preventing pattern image formed at the above-described forgery-preventing pattern forming portion 301 with an input original image (e.g., forms or certificates) will be described more specifically.

Figure 23:
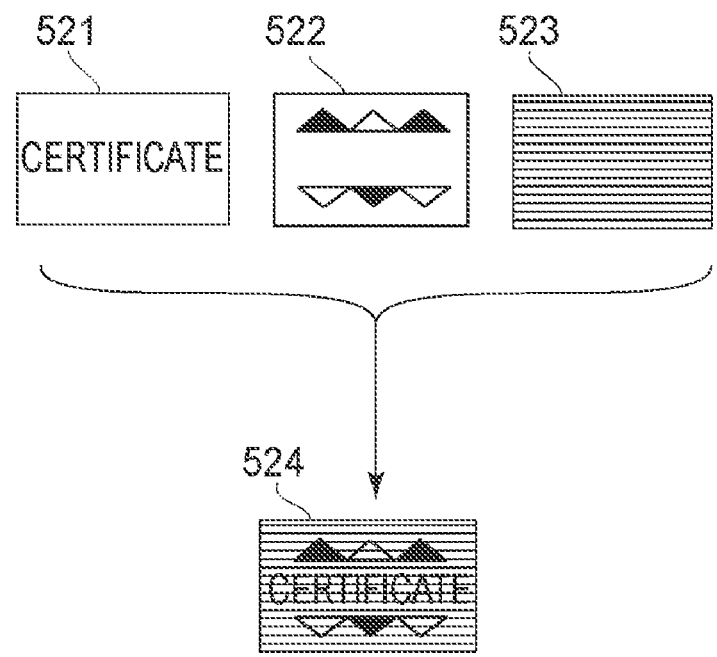
FIG. 23 is a schematic view showing an embodiment of a synthesizing processing of an input original image and a forgery-preventing pattern image.

FIG. 23 is a schematic view showing a combining processing for combining the input original image with the forgery-preventing pattern image. In FIG. 23, a text attribute data 511, a graphic attribute data 522, and an image attribute forgery-preventing pattern image 523 are shown.

At the combining portion 302 provided to a printer driver or a printer controller of the image forming apparatus, in accordance with precedence of arrangement of the respective images 521-523, these images are superposed by software. By this, as indicated by a reference numeral 524 in FIG. 23, an image obtained by combining the text attribute data, the graphic attribute data, and the image attribute forgery-preventing pattern image is formed.

In the embodiment shown in FIG. 23, the image attribute forgery-preventing pattern image 523 is used as a lowest layer on which the text attribute data 521 and the graphic attribute data 522 are superposed. For example, at a position where the image attribute forgery-preventing pattern image 523 and the text attribute data 521 overlap with each other, the text attribute data 521 is drawn in precedence to the forgery-preventing pattern image 523. Thus, the forgery-preventing pattern image is properly disposed at the background of the input original image, so that viewability of the text attribute data and the graphic attribute data is not lowered.

Further, in the embodiment shown in FIG. 23, the forgery-preventing pattern image 523 has the same size as the input image. However, in the case where the forgery-preventing pattern image is intended to overlap only in a part of its area, an input background image having a size corresponding to the part of the area is inputted and only a forgery-preventing pattern image coinciding with the inputted image size is formed at the forgery-preventing pattern image forming portion 301 and then at the combining portion 302, the formed forgery-preventing pattern image may be combined with the input original image. As the formed forgery-preventing pattern image is smaller, the pressing at the forgery-preventing pattern image forming portion 301 can be performed at a higher speed.

Further, in the case where the forgery-preventing pattern image is combined with an input original image having no layer structure in which various images have already been combined, e.g., such a constitution that a specific pixel value area (e.g., a white background area) of the input original image is detected and only in the detected area, the forgery-preventing pattern image is combined may also be employed.

[Toner Used for Forgery-Preventing Pattern Image Formation]

In the image forming apparatuses shown in FIGS. 1-4 or FIGS. 32-34, the image density non-uniformity in a longitudinal direction of the photosensitive drum 1 (a conveyance direction of the transfer material) and the image density non-uniformity in a circumferential direction of the photosensitive drum 1 (a direction substantially perpendicular to the conveyance direction of the transfer material) can occur as described above. Further, due to these density non-uniformity, density non-uniformity of the forgery-preventing pattern image in the longitudinal direction and density non-uniformity of the forgery-preventing pattern image in the circumferential direction can occur.

The density non-uniformity in the longitudinal direction occurs due to variation factors such as charge potential non-uniformity due to sensitivity non-uniformity of the photosensitive drum 1, exposure portion potential non-uniformity, exposure portion potential non-uniformity due to light amount non-uniformity of exposure light such as laser light, and charge potential non-uniformity due to charge non-uniformity of the charging apparatus.

The density non-uniformity in the circumferential direction occurs due to variation factors such as eccentricity of the photosensitive drum 1 or the developing sleeve, and a distance fluctuation between the developing sleeve and the photosensitive drum (S-D gap fluctuation) caused by contamination or the like of a regulation member for regulating a distance between the developing sleeve and the photosensitive drum 1.

Further, when the formation of the forgery-preventing pattern is performed by using a color conversion table for forming an actual image (original image) in the conventional image forming apparatus using a plurality of types of toners different in density level (dark color toner and light color toner), there can arise a problem of density non-uniformity due to dot deviation.

That is, in the case where the forgery-preventing pattern image is formed with only the dark color toner, a difference in density between the latent image and the background portion during forgery-preventing pattern image formation is caused to occur, so that there can arise a problem such that the forgery-preventing pattern image appears although the original image is used. Alternatively, there can arise a problem such that the forgery-preventing pattern image disappears during copying of the forgery-preventing pattern image or that the background which should disappear is copied to cause the forgery-preventing pattern image to be unrecognizable. Further, when the forgery-preventing pattern image is formed with a color conversion table used for forming an actual image (original image) with both of the dark color toner and the light color toner in the image forming apparatus using the dark color toner and the light color toner, dot deviation due to mixing of both of the dark color toner and the light color toner is caused to occur during the forgery-preventing pattern formation. Then, due to this dot deviation, there can arise a problem such that a clear forgery-preventing pattern with a uniform density is not formed.

One of the objects of the present invention is to improve uniformity of the forgery-preventing pattern image density in the image forming apparatus using the plurality of types of toners different in density level (dark color toner and light color toner) Further, one of the objects of the present invention is to prevent the dot deviation in the forgery-preventing pattern image. Further, one of the objects of the present invention is to form a proper forgery-preventing pattern image. That is, one of the objects of the present invention is to form a forgery-preventing pattern image with a uniform density and to provide a clear forgery-preventing image during copying in an image forming apparatus in which dark color toner developing device and a light color toner developing device are mounted.

[Forgery-Preventing Pattern Image Control]

Hereinbelow, a characteristic feature of the present invention will be described.

In this embodiment, as a method of reducing the above-described forgery-preventing pattern image non-uniformity due to the density non-uniformity in the image forming apparatus capable of forming an image by using the dark color toner and the light color toner, the forgery-preventing pattern image is formed with only the light color toner.

That is, in this embodiment, the image forming apparatus includes a dark color image forming means for forming an image with such a recording material of recording materials having the same hue and different lightness as has a lower lightness and a light color image forming means for forming an image with a recording material having a higher lightness. Further, in this embodiment, the image forming apparatus is capable of forming a forgery-preventing pattern image which prevents forgery by being copied to case a difference in contrast. The image forming apparatus further includes a control means capable of effecting control so that a forgery-preventing pattern image containing the latent image portion and the background portion or an actual image (original image) is formed in accordance with associated image information by the dark color image forming means and/or the light color image forming means. Further, the control means is capable of effecting control so that image formation is performed by using both of the dark color image forming means and the light color image forming means during formation of the original image and by using only the light color image. In the present invention, an image other than a special pattern (image) as the forgery-preventing pattern image is referred to as the "actual image (original image)".

Typically, the forgery-preventing pattern image includes the latent image portion at which dots remain and appear as an image after copying by an objective copying machine and the background portion at which dots sufficiently disappear to the extent that the dots at the latent image portion can appear as the image after the copying. Further, before the copying, the latent image portion and the background portion are configured so as not to be discriminable at first glance. Further, the actual image (original image) is an image, based an image information (an original for copying in the case of the copying machine or image information on characters or graphics formed by application software or the like for a computer in the case of the printer), different from the forgery-preventing pattern image containing the latent image portion and the background portion. Typically the actual image (original image) and the forgery-preventing pattern image are combined and outputted.

In an embodiment, the image processing means for forming information on the forgery-preventing pattern image containing the latent image portion and the background portion is realized by a printer driver installed in host equipment communicatably connected to the image forming apparatus. The forgery-preventing pattern image information formed by this printer driver is inputted into the above-described control means of the image forming apparatus. Further, in another embodiment, the image processing means for forming information on the forgery-preventing pattern image containing the latent image portion and the background portion is provided to the image forming apparatus. The forgery-preventing pattern image information formed by this image processing means in inputted into the above-described control means. In this case, a printer controller having a function as the image processing means and the control means may be provided to the image forming apparatus.

That is, e.g., as shown in the block diagram of FIG. 10, during the printing, the image processing means constituted by including the forgery-preventing pattern image forming portion 301, the combining portion 302, and the image data processing portion 303 is realized by the printer driver 300. Then, the forgery-preventing pattern image information formed by the printer driver 300 is inputted into the image forming apparatus (more specifically the printer controller as the above-described control means) 304. Further, e.g., as shown in the block diagram of FIG. 13, during the copying, the image processing means constituted by including the forgery-preventing pattern image forming portion 301, the combining portion 302, and the image data processing portion 303 is mounted to the image forming apparatus (more specifically the printer controller) 304. Then, the forgery-preventing pattern image information formed by the image forming apparatus 304 is inputted into the above-described control means which may also be served by the printer controller.

To describe further, the above-described density non-uniformity is larger with smaller dots, i.e., a smaller density. This is because density fluctuation with respect to the above-described variation factors is larger with smaller dots (smaller density) when the surface of the photosensitive drum 1 is exposed to light to change a surface potential of the photosensitive drum 1 from a charge potential (non-exposed portion potential or dark portion potential) to an exposed portion potential.

Figure 24:
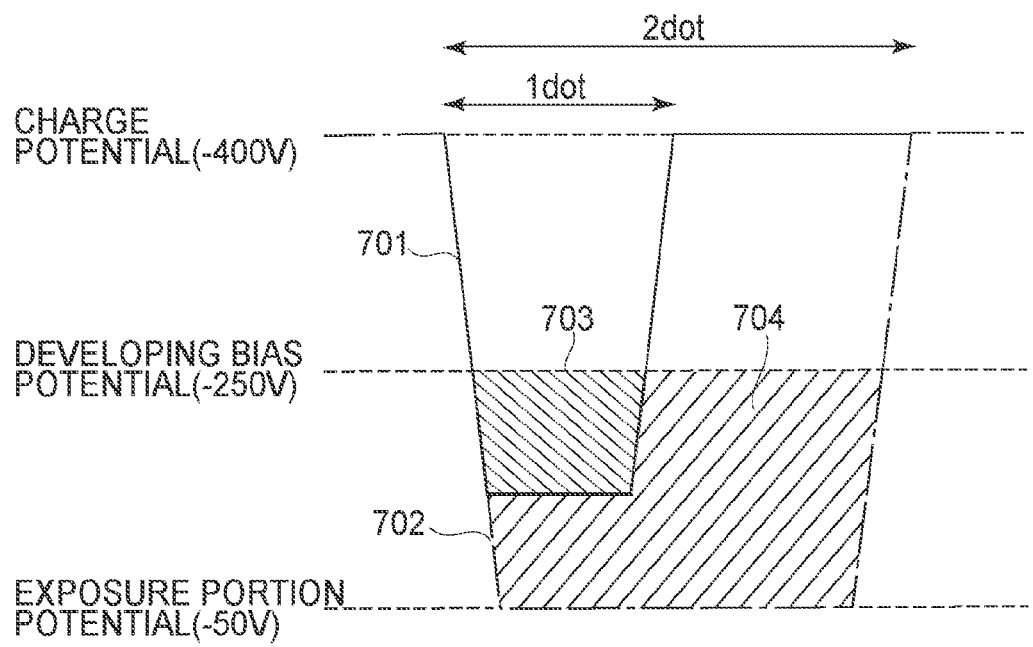
FIG. 24 is a schematic view for illustrating potentials and a toner amount per unit area on a photosensitive drum.

FIG. 24 is a schematic view showing an embodiment of potentials, with respect to surface potentials of the photosensitive drum 1, when one dot square (one dot) and two dot square (four dots) of a 600 dpi pattern is exposed to light. That is, a solid line 701 in FIG. 24 schematically represents a potential distribution on the photosensitive drum 1 when the one dot square is exposed to light and alternate long and short dashed lines 702 schematically represent a potential distribution on the photosensitive drum 1 when the two dot square is exposed to light.

A toner amount (per unit area) on the photosensitive drum 1 is schematically shown by hatching portions 703 and 704 in FIG. 24. The toner amount at the one dot square-exposed portion is indicated by the hatching portion 703, and the toner amount at the two dot square-exposed portion is indicated by the total of the hatching portions 703 and 704.

As shown in FIG. 24, generally, at a boundary between the exposed (exposure) portion and the non-exposed (non-exposure) portion, the potential is not changed vertically but is changed from the charge potential to the exposed portion potential while being inclined.

Accordingly, when the one dot square is exposed to light, the potential does not completely fall from the charge potential to the exposed portion potential, so that development with toner is unstable, i.e., whether or not the toner is deposited on the exposed portion is unstable. Thus, an amount of deposition of the toner is liable to be decreased.

On the other hand, when the two dot square is exposed to light, the potential on the photosensitive drum 1 falls from the charge potential to the exposed portion potential, so that development with toner is stabilized, i.e., deposition of the toner on the exposed portion is stabilized. For this reason, e.g., the toner deposition amount is increased more than 4 times that at the time of exposing the one dot square to light.

Thus, when the dot exposed to light on the photosensitive drum 1 is small, the development with the toner is liable to be unstable, so that the amount of toner deposition onto the exposed portion is liable to be unstable. For this reason, when the dot exposed to light on the photosensitive drum 1 is small, fluctuation in toner deposition amount is increased with respect to the variation factors of the density non-uniformity as described above. As a result, density non-uniformity of the forgery-preventing pattern image is liable to occur conspicuously.

On the other hand, when the dot exposed to light on the photosensitive drum 1 is large, the development with the toner is liable to be stabilized, so that the amount of toner deposition onto the exposed portion is liable to be stabilized. For this reason, when the dot exposed to light on the photosensitive drum 1 is large, fluctuation in toner deposition amount is decreased with respect to the variation factors of the density non-uniformity as described above. As a result, density non-uniformity of the forgery-preventing pattern image is less liable to occur. That is, when the dot is large, the forgery-preventing pattern image non-uniformity is less liable to occur.

Figure 25:
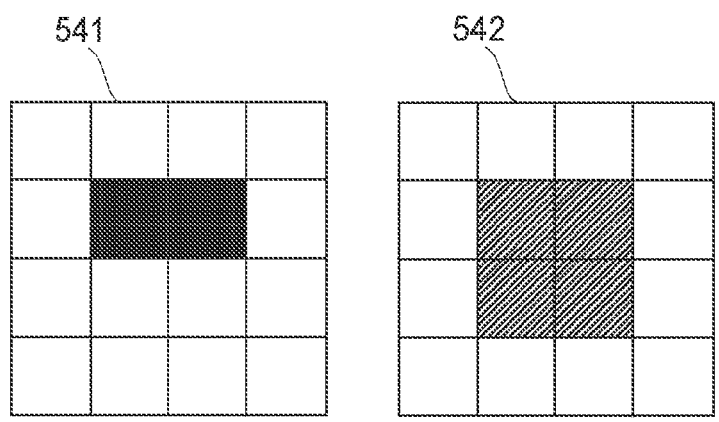
FIG. 25 is a schematic view showing an embodiment of dark color toner dots and light color toner dots exhibiting the same density.

Here, FIG. 25 shows dark color toner dots 541 and light color toner dots 542. From the relationship between the output image signal (area) and the density shown in FIG. 7, two dots of the dark color toner dots 541 in FIG. 25 and four dots of the light color toner dots 542 in FIG. 25 have the substantially same density.

Accordingly, in the case of forming the forgery-preventing pattern image at the same density, the dot size of the forgery-preventing pattern image can be increased by forming the forgery-preventing pattern image with the light color toner rather than the case of forming the forgery-preventing pattern image with the dark color toner. That is, rather than the case of forming the forgery-preventing pattern image with the dark color toner, the forgery-preventing pattern image portion non-uniformity at the latent image portion and the background portion can be decreased by forming the forgery-preventing pattern image with the light color toner.

In the case where the forgery-preventing pattern image is formed with only the light color toner in accordance with this embodiment, by increasing the dot size of the forgery-preventing pattern image, the amount of toner deposited on the photosensitive drum 1 by development is stabilized, so that it is possible to prevent the density non-uniformity of the forgery-preventing pattern image.

In the image forming apparatuses capable of forming images with the dark color toner and the light color toner as shown in FIGS. 1-4, the color conversion tables for the original image as shown in FIGS. 8 and 9 have been conventionally used also with respect to the forgery-preventing pattern image. For that reason, the forgery-preventing pattern image has been formed by mixing of the dark color toner and the light color toner. By this, dot deviation (color misregistration) for toner images formed with the dark color toner and the light color toner, respectively, is caused to occur, so that there has arisen such a problem that the forgery-preventing pattern image density is not stabilized.

Figure 26:
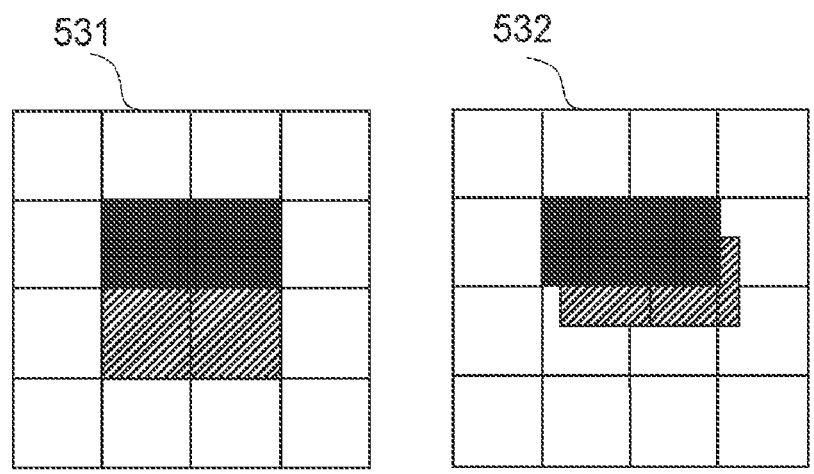
FIG. 26 is a schematic view showing an embodiment of dot deviation.

FIG. 26 includes schematic views for illustrating the dot deviation between the dark color toner and the light color toner.

In FIG. 26, a reference numeral 531 shows that two dots of the dark color toner (e.g., Bk (black portion)) and two dots of the light color toner (e.g., LBk (gray portion)) are arranged with no deterioration.

A reference numeral 532 in FIG. 26 shows an embodiment of a state in which the two dots of the dark color toner and the two dots of the light color toner are arranged with dot deviation.

When compared with the density of the image shown in 531, the density of the image shown in 532 is decreased since an area of the light color toner is substantially decreased.

The above-described dot deviation is particularly noticeable in the tandem-type image forming apparatuses shown in FIGS. 1 and 3. In the tandem-type image forming apparatus, the plurality of image forming stations is disposed, so that there is dot deviation caused by deviation of positional accuracy of the image forming stations. Further, there is dot deviation caused by a change in friction coefficient (change in torque) between the intermediary transfer belt 40 and photosensitive drum 1 depending on the toner amount for image formation (the toner amount of the original image). Further, there is dot deviation caused by deviation of image synchronization timing occurring when the toner images consisting of the plurality of types of toners are formed on the intermediary transfer belt 40 in a superposition manner.

In the single drum-type image forming apparatuses shown in FIGS. 2 and 4, the image forming station (i.e., the photosensitive drum 1) is only one, so that they have an advantage that the dot deviation attributable to the positional accuracy is slight compared with the tandem-type image forming apparatus. However, the dot deviation attributable to the friction coefficient and that attributable to the image synchronism timing area at the substantially same level as those in the tandem-type image forming apparatus.

Here, the dot deviation attributable to the above-described friction coefficient will be described.

In the case where the toner amount on the photosensitive drum 1 is large (in the case where the amount of toner primary-transferred onto the intermediary transfer belt 40 is large), the toner functions as a spacer (spacer effect) to decrease friction coefficient, so that a rotation speed of the intermediary transfer belt 40 is increased. On the other hand, in the case where the toner amount is small (in the case where the amount of toner primary-transferred onto the intermediary transfer belt 40 is small), the toner does not function as the spacer to increase the friction coefficient, so that the rotation speed of the intermediary transfer belt 40 is decreased. Accordingly, due to this fluctuation in rotation speed of the intermediary transfer belt 40, the dot deviation is caused to occur.

Further, the dot deviation attributable to the image synchronization timing will be described.

In the case where the toner images consisting of the plurality of types of toners are formed on the intermediary transfer belt 40 in a superposition manner, e.g., the following methods of various types are used so that the images are synchronized with and superposed on each other. First, there is a method in which the speed of the intermediary transfer belt 40 is calculated to determine the timing. Further, there is a method in which a reference position patch is formed with toner on the intermediary transfer belt 40 and this patch is detected to determine the timing. Further, there is a method in which a reference member is added to the intermediary transfer belt 40 and this member is detected to determine the timing. However, in the methods of any types, fluctuation in image synchronization timing or tolerance is caused to occur, so that deviation of the image synchronization timing of superposition is caused to occur. Thus, dot deviation due to this deviation of the image synchronization timing is caused to occur.

In the case where the forgery-preventing pattern image is formed with only the light color toner in accordance with this embodiment, the above-described dot deviation is not caused to occur, so that the forgery-preventing pattern image density non-uniformity attributable to the dot deviation does not occur.

Further, in the foregoing description, the dot deviation in the black forgery-preventing pattern image is described but also in a full-color forgery-preventing pattern image, it is possible to decrease the degree of the dot deviation by using only the dark color toner.

For example, in the case of forming a red forgery-preventing pattern image, yellow toner and magenta toner are mixed, so that four color toners of yellow (Y), light yellow (LY), magenta (M), and light magenta (LM) can be mixed in a conventional case. In this case, due to the dot deviation, the forgery-preventing pattern image density non-uniformity and forgery-preventing pattern image color(ing) non-uniformity are large.

Also in this case, by using only the light color toner, the forgery-preventing pattern image is formed with the toners of only two colors of LY and LM, so that the forgery-preventing pattern image density non-uniformity and the forgery-preventing pattern image color non-uniformity which are attributable to the dot deviation can be alleviated.

In this way, according to this embodiment, by forming the forgery-preventing pattern image with only the light color toner, the forgery-preventing pattern image can be stably formed, so that it is possible to alleviate the forgery-preventing pattern image density non-uniformity.

That is, by forming the forgery-preventing pattern image with the light color toner, even under such a condition that the density non-uniformity is caused to occur if the forgery-preventing pattern image is formed with the dark color toner, a density difference between the latent image portion and the background portion of the forgery-preventing pattern image can be reduced to form a clear forgery-preventing pattern with uniform density and a clear forgery-preventing pattern image also during copying. In other words, in the case of forming the forgery-preventing pattern image with the light color toner, even when the dot size of the forgery-preventing pattern image (latent image portion/background portion) is increased, it is possible to form dots with a stable density without adversely affecting an actual image (document). For this reason, even under such a condition that the density non-uniformity occurs in the longitudinal direction/circumferential direction if the dark color toner is used, it is possible to obtain a uniform forgery-preventing pattern image.

Next, the method of forming the forgery-preventing pattern image with only the light color toner will be described more specifically.

In the conventional method, the color conversion table for the original image as shown in FIG. 8 or 9 has also been used for the forgery-preventing pattern image, so that the forgery-preventing pattern image has been formed with two types of toners consisting of the dark color toner and the light color toner depending on the forgery-preventing pattern image density. On the other hand, in this embodiment, a color conversion table for the forgery-preventing pattern image as described below, different from the color conversion tables for the original image as shown in FIGS. 8 and 9, is used.

Figure 27:
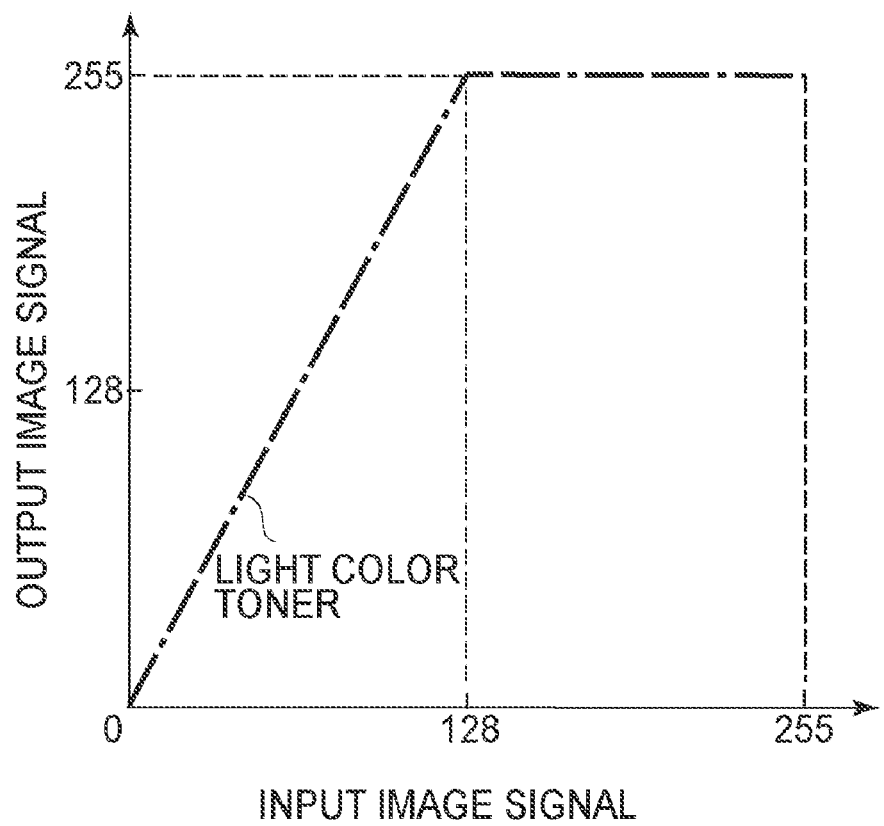
FIGS. 27-29 are graphs each showing an embodiment of a color conversion table showing a relationship between an input image signal and an output image signal in the case where only a light color toner is used.

FIG. 27 shows an embodiment of the color conversion table for the forgery-preventing pattern image. That is, the color conversion table shown in FIG. 27 is designed to employ only the light color toner for the forgery-preventing pattern image. For that reason, by employing the color conversion table shown in FIG. 27, the forgery-preventing pattern image is formed with only the light color toner.

Further, in the case where the forgery-preventing pattern image is formed with only the light color toner by using the color conversion table, with respect to an input image signal of a predetermined value or more, e.g., an forgery-preventing pattern image corresponding to an input image signal of 128 or more, the same density corresponding to an output image signal of 255 (maximum output image signal) is obtained. For that reason, an upper limit density is settable so that the forgery-preventing pattern image does not have a predetermined density (a maximum density Dmax(L) for the light color toner) or more. Accordingly, the forgery-preventing pattern image is set to be dark, so that there is an advantage that poor viewability of the original image is less liable to occur.

Thus, in this embodiment, different color conversion tables are employed during actual image (original image) formation and forgery-preventing pattern image formation. During the forgery-preventing pattern image formation, by employing a color conversion table, such that only the light color toner is used, different from a color conversion table during the actual image (original image) formation.

Figure 28:
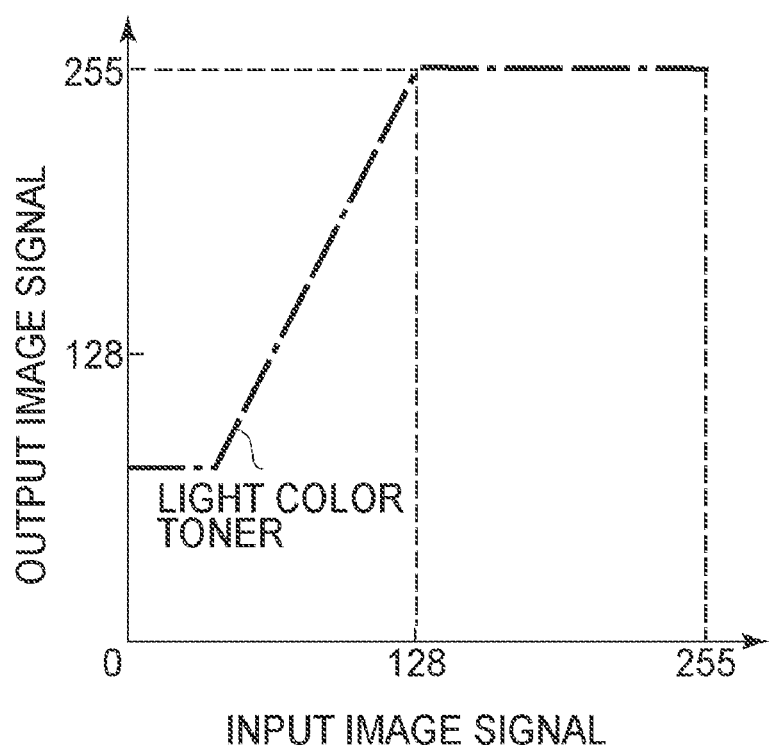

FIG. 28 shows an embodiment of a color conversion table designed for the latent image background of the forgery-preventing pattern image. In the color conversion table of FIG. 28, with respect to a predetermined value or less of input image signals, an output image signal is designed so as to be constant at a predetermined value and so as not to be decreased with a decreasing input image signal.

According to the color conversion table shown in FIG. 28, it is possible to set a lower limit density so that the latent image portion does not have a predetermined density or less, so that there is an advantage that it is possible to design the latent image portion so as not to disappear during copying.

Figure 29:
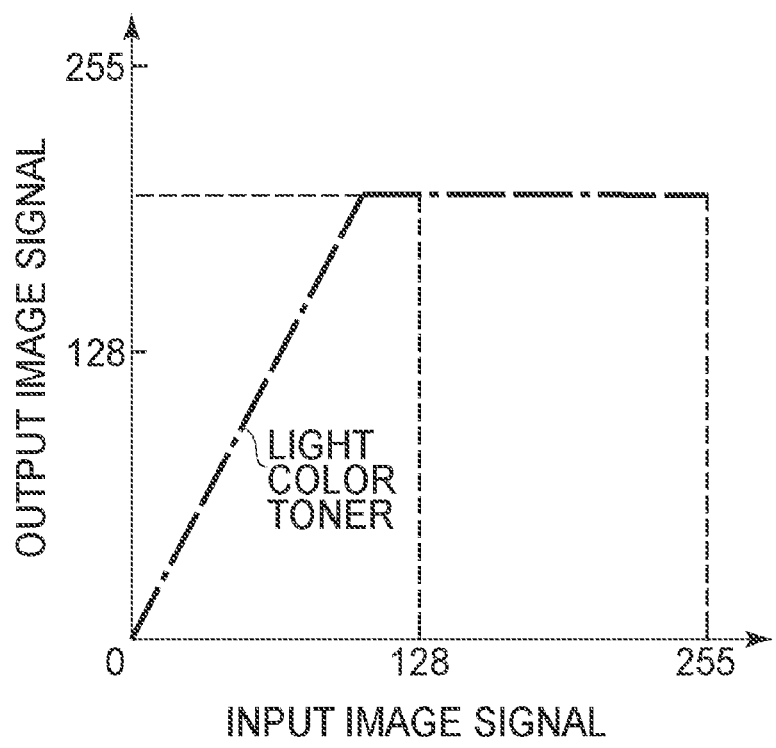

FIG. 29 shows an embodiment of a color conversion table designed for the background portion of the forgery-preventing pattern image. In the color conversion table of FIG. 29, with respect to input image signals having values not less than a predetermined value less than the maximum output image signal described above, an output image signal is designed so as to be constant at a predetermined value and so as not to be increased with an increasing input image signal.

According to the color conversion table shown in FIG. 29, it is possible to set an upper limit density so that the background portion does not have a predetermined density or more, so that there is an advantage that it is possible to design the background portion so as not to remain during copying.

Accordingly, the color conversion table may also be set so that the color conversion table of FIG. 29 is used as the color conversion table for the background portion of the forgery-preventing pattern image and the color conversion table of FIG. 28 is used as the color conversion table for the latent image of the forgery-preventing pattern image.

Thus, during the forgery-preventing pattern image formation, the different color conversion tables can be employed between the latent image portion and the background portion of the forgery-preventing pattern image. By this, it is possible to form a more proper forgery-preventing pattern image by employing color conversion tables depending on characteristics, e.g., in such a manner that limitations such as the lower and upper limit values are provided for the latent image portion and the background portion of the forgery-preventing pattern image.

Actually, in the image forming apparatuses of FIG. 1 to FIG. 4, when the forgery-preventing pattern image was formed with only the light color toner by using the color conversion table of FIG. 27, it was possible to decrease the degree of the forgery-preventing pattern image density non-uniformity and form a forgery-preventing pattern image with a uniform density.

As described above, according to this embodiment, in the image forming apparatus capable of forming the image with the dark color toner and the light color toner, only the light color toner is used during the forgery-preventing pattern image formation. By this, it is possible to prevent the forgery-preventing pattern image density non-uniformity attributable to the density non-uniformity in the longitudinal direction/circumferential direction and prevent the forgery-preventing pattern image density non-uniformity attributable to the dot deviation. As a result, it is possible to form the forgery-preventing pattern image with a uniform density. That is, according to this embodiment, in the image forming apparatus using a plurality of types of toners different in density level, it is possible to improve uniformity of the forgery-preventing pattern image density to form the forgery-preventing pattern image which is proper forgery-preventing pattern image.

Embodiment 2

Next, another embodiment according to the present invention will be described with reference to FIG. 30 and FIG. 31.

This embodiment is applicable to an image forming apparatus having the same fundamental structure as that described in Embodiment 1.

First, a conventional forgery-preventing pattern density adjustment (forgery-preventing pattern density calibration) will be described.

In the case where a forgery-preventing pattern image is actually formed by using an image forming apparatus such as a copying machine or a printer, a latent image portion and a background portion are not always outputted with intended densities.

The reason therefor includes, e.g., the following factors. That is, the factors include density instability depending on various conditions such as an engine characteristic of the image forming apparatus; a difference in dither matrix for outputting a threshold pattern; a difference among individuals of the apparatus; printing environments such as a temperature, a humidity, etc., durability of the engine; a difference in sheet (medium); a difference in toner used in the apparatus; and so on. That is, an optimum input tone gradation with respect to each of dither matrixes for the latent image portion and the background portion can be different depending on a type of the image forming apparatus, the dither matrix, an individual image forming apparatus, the printing environment, the sheet, the toner, etc.

For that reason, even in the case where the engine characteristic or the printing environment of the image forming apparatus is different, it is preferable that the forgery-preventing pattern image is formed after a latent image threshold pattern and a background threshold pattern which have the substantially same density during output. However, it is practically difficult to automatically calculate an optimum latent image threshold pattern and an optimum background threshold pattern in consideration of all of variation factors including a fluctuation by the printing environment.

Accordingly, before the forgery-preventing pattern image is outputted, it is preferable that a function of obtaining a latent image threshold pattern and a background threshold pattern which provide the substantially same density at the latent image portion and the background portion, i.e., a forgery-preventing pattern density calibration function is provided for each image forming apparatus.

As a method of providing this forgery-preventing pattern density calibration function, a method in which the densities (at the latent image portion and the background portion) are adjusted so as to be substantially equal to each other by charging tone gradation of the output image signal with respect to ether one or both of a latent image dither matrix and a background dither matrix.

Figure 30:
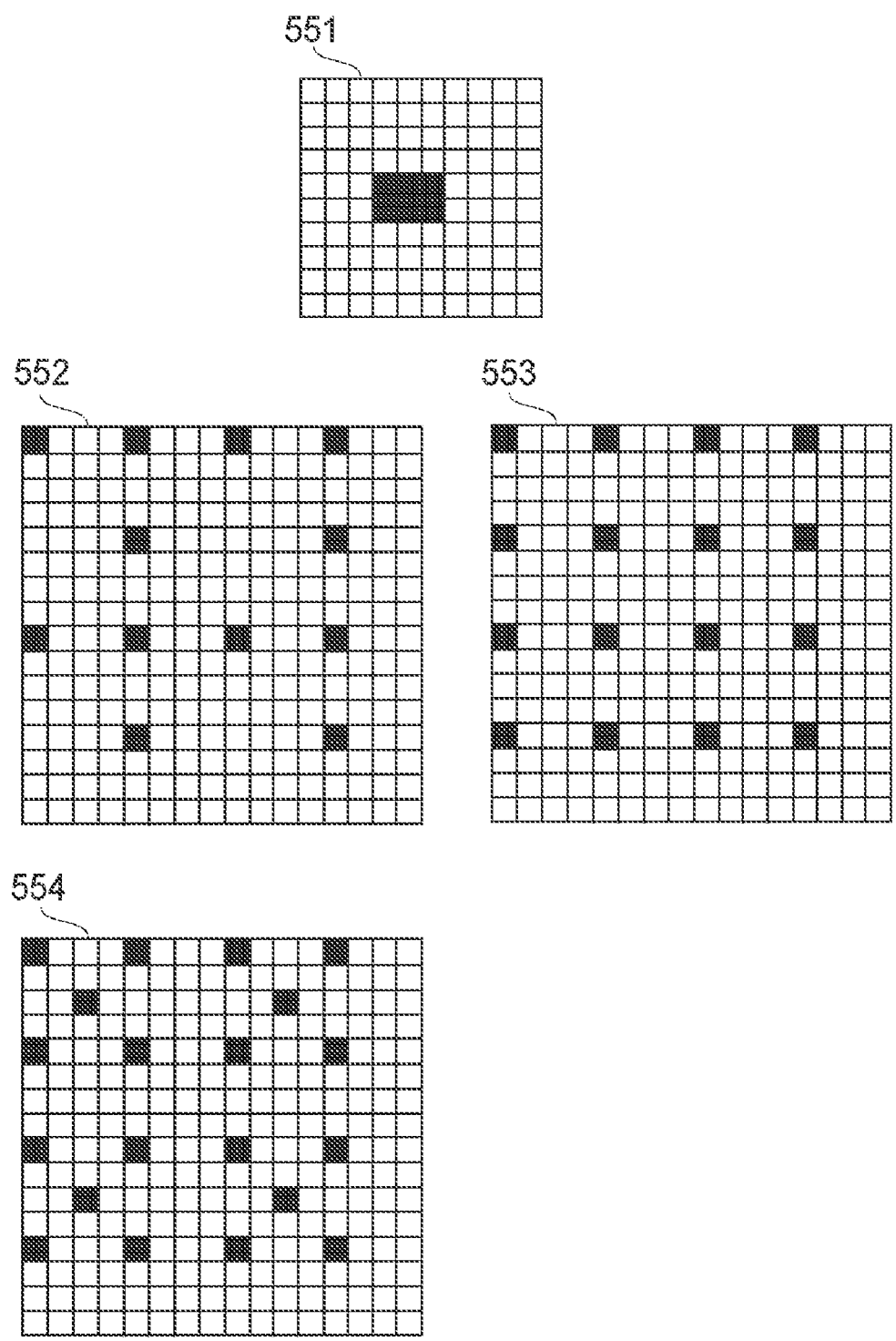
FIG. 30 includes schematic views showing an embodiment of a latent image threshold pattern and a background threshold pattern obtained by performing dither matrix threshold processing with respect to gradation of a plurality of output image signals.

FIG. 30 includes schematic views showing a latent image threshold pattern and background threshold patterns obtained by subjecting a plurality of tone gradations of output image signals to threshold processing with a dither matrix. In FIG. 30, a reference numeral 551 represents a latent image threshold pattern obtained by inputting a tone gradation of 6 into a 10 pixel-square-latent image dither matrix, in which an area ratio of a black pixel is 6%.

On the other hand, in FIG. 30, reference numerals 552-554 represent background threshold patterns obtained by inputting tone gradation of 12, 16 and 20, respectively, into 16 pixel-square-background dither matrixes, in which area ratios of black pixels are 4.69%, 6.25% and 7.81%, respectively. Assuming that the density adjustment is performed by changing a tone gradation of the output image signal with respect to a 4×4 pixel-background dither matrix, in this case, the area ratio of the black has only a range with 4×4+1=17 levels and a tone gradation change in about 6% steps is only obtained, so that delicate density adjustment cannot be performed.

However, as shown by the background dither matrixes 552-554 in FIG. 30, the background threshold pattern outputted from the dither matrix having the large number of representable time gradations is capable of finely adjusting the density, thus being suitable for the density calibration.

Next, a general description of conventional forgery-preventing pattern density test print for realizing the forgery-preventing pattern density calibration function will be made.

The forgery-preventing pattern density test print can be provided to the printer driver or the image forming apparatus.

Figure 31:
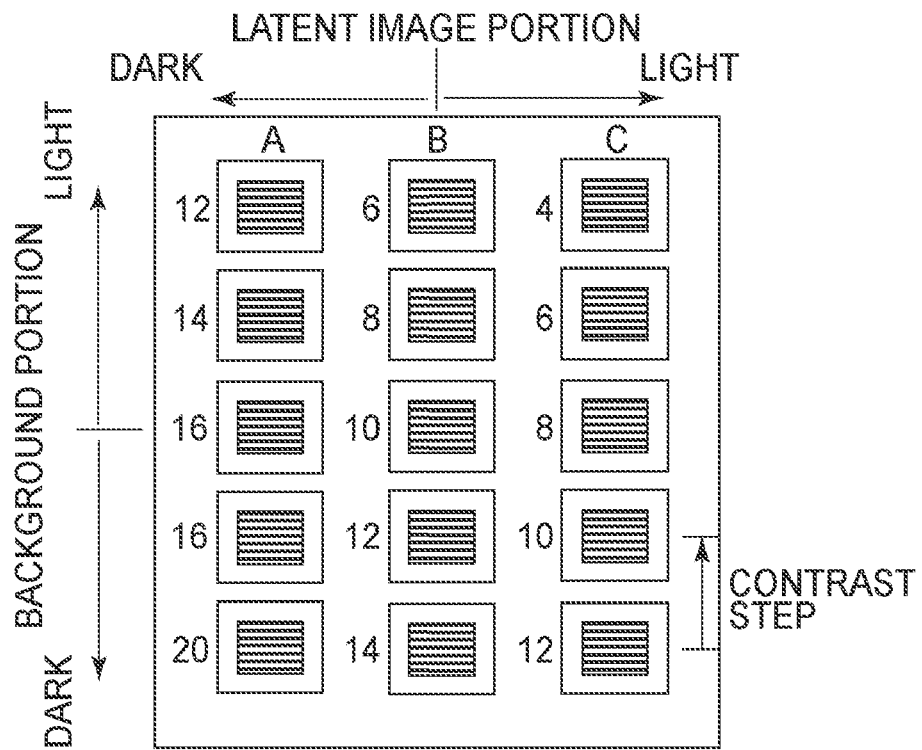
FIG. 31 is a schematic view showing an embodiment of a test print sheet on which patches changed in density of a background portion and a latent image are two-dimensionally arranged.

For example, FIG. 31 shows an embodiment of a test print sheet on which patches changed in density at the latent image portion and the background portion are two-dimensionally arranged. Each of the patches is constituted by including the latent image portion and the background portion and may also include a camouflage portion. Each of the patches in FIG. 31 includes the latent image portion at a central portion and the background portion at a peripheral (surrounding) portion. In this case, a latent image/background area designating image for designating the latent image portion and the background portion is a rectangle but is not necessarily limited to the rectangle. The latent image/background area designating image may be a character such as "INVALID" and may be disposed visually discriminatable, e.g., in such a manner that the latent image portion and the background portion are arranged adjacent to each other as separate patches.

In the test print sheet of FIG. 31, the density of the background portion is changed with respect to a vertical direction of the sheet. As a method of changing the density of the background portion, e.g., in the case where the background dither matrix has a size of 16×16 pixels, there is a method of changing the tone gradation of the output image signal with respect to the background dither matrix as shown in the background threshold patterns 552-554 of FIG. 30. For example, when the tone gradation of the output image signal with respect to the background dither matrix is changed by fours, the area ratio of the black pixel in the threshold pattern is charged by about 1.5% each.

Further, in the test print sheet of FIG. 31, the density of the latent image with respect to a horizontal direction of the sheet. As a method of changing the density of the latent image portion, e.g., there is a method of changing a size of the latent image dither matrix. For example, in the case where the size of the latent image dither matrix is 10×10 pixels, when the threshold pattern is formed at a atone gradation of 9 of the output image signal, an area ratio of a black pixel is 9%. Further, in the case where the size of the latent image dither matrix is 12×12 pixels, when the threshold pattern is formed at the tone gradation of 9 of the output image signal, the area ratio of the black pixel is 6.25%. Further, in the case where the size of the latent image dither matrix is 14×14 pixels, when the threshold pattern is formed at the tone gradation of 9 of the output image signal, the area ratio of the black pixel is about 4.6%.

Further, as another method of changing the density of the latent image portion, there is a method in which the size of the latent image dither matrix is fixed and the tone gradation of the output image signal with respect to the latent image dither matrix is changed. For example, when the size of the latent image dither matrix is fixed at 10×10 pixels and the tone gradation of the output image signal is changed to 6, 8 and 12, the area ratio of the black pixel in the threshold pattern is changed to 6%, 9%, and 12%, respectively.

However, the tone gradation of the output image signal with respect to the latent image dither matrix is required to be not less than a certain in level in order to avoid such a state that dots at the latent image portion are decreased in size to the extent that the dots disappear after copying and remain even by copying not to satisfy a necessary condition for the latent image portion.

An adjusting value at which the densities of the latent image portion and the background portion are substantially equal to each other is selected from the test print sheet image outputted by the image forming apparatus, and an adjusting value at which the latent image portion remains and the background portion disappears is selected from a copied sheet image obtained by copying the test print sheet of FIG. 31 by the image forming apparatus. Then, a user inputs an optimum adjusting value into the image forming apparatus or the printer driver to complete the forgery-preventing pattern density calibration.

In this embodiment, in the image forming apparatus which has the forgery-preventing pattern density calibration and is capable of forming the image with the dark color toner and the light color toner, the forgery-preventing pattern image is formed with the light color toner. By this, it is possible to prevent the forgery-preventing pattern density non-uniformity and to quickly and properly perform the forgery-preventing pattern density calibration.

For example, in order to perform the forgery-preventing pattern density calibration, the case where the output image signal changed by changing the input image signal in the conventional color conversion table of FIG. 8 or FIG. 9 is considered. In this case, there are the case of effecting image formation with only the light color toner and the case of effecting image formation by mixing of the dark color toner and the light color toner, in mixture. Particularly, in the case of effecting image formation by mixing of the dark color toner and the light color toner, the forgery-preventing pattern image density non-uniformity attributable to the dot deviation as described in Embodiment 1 can occur.

Further, e.g., in the case where the dark color toner and the light color toner show the density relationships shown in FIG. 7, with respect to image data for the light color toner, the two pixel PWM is performed in order to enhance a tone gradation characteristic, thus increase a unit of recording. On the other hand, with respect to image data for the dark color toner, the one pixel PWM is performed from the viewpoint of importance of the resolving power. Further, in the case of employing the dither matrix, processing such that two pixels for the light color toner are outputted in order to output a density corresponding to one pixel for the dark color toner.

Accordingly, in the case where the forgery-preventing pattern image formation is effected by the mixing of the dark color toner and the light color toner, the following problem can arise. That is, in the case dark color toner dots and light color toner dots are unevenly distributed in blocks when the input image signal of the forgery-preventing pattern image is changed to change the output image signal, there arise a problem of moire and a problem that the forgery-preventing pattern image dot is seen in a double state. For that reason, it is necessary to perform arranging processing so as to dispose the dark color toner dots and the light color toner dots in a distributed state. Accordingly, e.g., the latent image dither matrix of FIG. 15 and the background dither matrix of FIG. 17 cannot be used as they are, so that arranging processing of the dark color toner and the light color toner is required. Therefore, there can arise a problem such that the dot arrangement at the latent image portion and the background portion of the forgery-preventing pattern image is complicated to require a long time for the forgery-preventing pattern image forming processing. Then, in this embodiment, similarly as in Embodiment 1, the forgery-preventing pattern image density non-uniformity attributable to the dot deviation is prevented by forming the forgery-preventing pattern image with only the light color toner. Further, the forgery-preventing pattern density calibration (processing) is performed so as to adjust the forgery-preventing pattern density by changing the input image signal to change the output image signal with use of, e.g., the dither matrixes of FIGS. 15 and 17 and the color conversion tables of FIGS. 27-29. By this, it is unnecessary to effect the arranging processing of the toner dots, so that it is possible to reduce the time required for the forgery-preventing pattern image forming processing.

As described above, according to the present invention, the image forming apparatus is configured to adjust the forgery-preventing pattern image density by changing the size or amount of the dots each at the latent image portion and the background portion of the forgery-preventing pattern image. That is, in this embodiment, in the image forming apparatus provided with the density adjusting mechanism for the forgery-preventing pattern image, the forgery-preventing pattern image is formed with only the light color toner. By this, the dot deviation is prevented to decrease the degree of the forgery-preventing pattern image density non-uniformity and there is no need to effect the dot arranging processing for the dark color toner and the light color toner, so that it is possible to improve a speed of the forgery-preventing pattern image forming processing.

As described above, the present invention is described based on the specific embodiments but, e.g., the above-described various numerical values for the dither matrixes, the color conversion tables, and so on are merely examples for simplifying the description and thus can be arbitrarily determined depending on the constitutions, settings, and the like for the image forming apparatus employed.

Further, in the above-described embodiments, the forgery-preventing pattern image is described as being always formed with only the light color toner. By this, the present invention can achieve the above-described functional effects, thus being very advantageous. However, as desired, the image forming apparatus of the present invention may employ a plurality of modes such as a mode for forming the forgery-preventing pattern image with only the light color toner, a mode for forming the forgery-preventing pattern image with only the dark color toner, and a mode for forming the forgery-preventing pattern image with the dark color toner and the light color toner. In this case, the above-described control mean is capable of forming an image at the forgery-preventing pattern image portion and an image at the actual image portion by properly selecting the color conversion table used for forgery-preventing pattern image formation and the color conversion table used for actual image (original image formation), respectively, in accordance with inputted mode selection instructions. A mode selection signal is inputted through an operating portion provided to the image forming apparatus or an operating portion of host equipment such as a personal computer communicatably connected to the image forming apparatus.

Further, the present invention is not limited to the image forming apparatuses described in the above-described embodiments but may also be applicable to image forming apparatuses in other embodiments including any combination of the embodiments described above.

According to the present invention, in the image forming apparatus capable of forming the image with at least one set of recording materials having the same hue and different lightness, it is possible to suppress a lowering in quality of the forgery-preventing pattern image due to the density fluctuation and the dot deviation of the forgery-preventing pattern image.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 111075/2007 filed Apr. 19, 2007, which is hereby incorporated by reference.

What is claimed is:

1. An image forming apparatus comprising:
    a dark color image forming station for forming an image with a toner having a hue and a lightness;
    a light color image forming station for forming an image with a toner having the same hue as and a higher lightness than the toner used by said dark color image forming station; and
    a control portion for effecting control so that an image to be emphasized is formable substantially only with the toner having the higher lightness, wherein the image to be emphasized disappears or has a lower density upon being copied.

2. The apparatus according to claim 1, wherein said control portion effects control, at least in a low density level area, so that an amount of toner per unit area at an identical density level at a first image portion, which is configured to not disappear or have a lower density upon being copied, is larger than that at a second image portion, which is configured to disappear or have a lower density upon being copied.

3. The apparatus according to claim 1, wherein said control portion effects control, at least in a high density level area, so that an amount of toner per unit area at an identical density level at a second image portion, which is configured to disappear or have a lower density upon being copied, is smaller than that at a first image portion, which is configured to not disappear or have a lower density upon being copied.

4. An image processing apparatus for being used together with an image forming apparatus comprising a dark color image forming station for forming an image with a recording material having a hue and lightness, and a light color image forming station for forming an image with the recording material having the same hue as and a higher lightness than the toner used by the dark color image forming station; said image processing apparatus comprising:
    an input portion into which an image data about an image to be emphasized is inputtable, wherein the image to be emphasized disappears or has a lower density upon being copied; and a control portion capable of effecting control so that the image to be emphasized is formed substantially only with the recording material having the higher lightness.

5. The apparatus according to claim 4, wherein said control portion effects control, at least in a low density level area, so that an amount of toner per unit area at an identical density level at a first image portion, which is configured to not disappear or have a lower upon being copied, is larger than that at a second image portion, which is configured to disappear or have a lower density upon being copied.

6. The apparatus according to claim 4, wherein said control portion effects control, at least in a high density level area, so that an amount of toner per unit area at an identical density level at a second image portion, which is configured to disappear or have a lower density upon being copied, is smaller than that at a first image portion, which is configured to not disappear or have a lower density upon being copied.

7. An image forming apparatus comprising:
a dark color image forming station for forming an image with a toner having a hue and a lightness;
a light color image forming station for forming an image with a toner having the same hue as and a higher lightness than the toner used by said dark color image forming station; and
a control portion for effecting control so that, when a forgery-preventing pattern image including a latent image portion, which appears upon being copied, and including a background portion, which disappears or has a lower density upon being copied, is formed on a recording material, the forgery-preventing pattern image is formed by substantially only said light color image forming station.

* * * * *